(12) United States Patent
Fujita et al.

(10) Patent No.: US 8,086,733 B2
(45) Date of Patent: Dec. 27, 2011

(54) METHOD AND PROGRAM FOR SUPPORTING SETTING OF ACCESS MANAGEMENT INFORMATION

(75) Inventors: Takahiro Fujita, Fujisawa (JP); Kyoko Mikami, Kawasaki (JP); Yuichi Yagawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 702 days.

(21) Appl. No.: 11/614,607

(22) Filed: Dec. 21, 2006

(65) Prior Publication Data

US 2008/0147859 A1  Jun. 19, 2008

(30) Foreign Application Priority Data

Oct. 18, 2006  (JP) .................................. 2006-283706

(51) Int. Cl.
*G06F 15/177* (2006.01)
*G06F 15/173* (2006.01)
(52) U.S. Cl. ....................................... 709/225; 709/221
(58) Field of Classification Search .................. 709/221, 709/223, 225
See application file for complete search history.

(56) References Cited

U.S. PATENT DOCUMENTS

| | | | |
|---|---|---|---|
| 6,553,401 B1 | 4/2003 | Carter et al. | |
| 7,403,987 B1 * | 7/2008 | Marinelli et al. | 709/223 |
| 2001/0008010 A1 | 7/2001 | Sanada et al. | |
| 2003/0195942 A1 * | 10/2003 | Muhlestein et al. | 709/215 |
| 2004/0268038 A1 | 12/2004 | Nagasoe et al. | |
| 2005/0022190 A1 | 1/2005 | Tachihara | |
| 2005/0154989 A1 * | 7/2005 | Maddocks et al. | 715/735 |
| 2005/0188161 A1 | 8/2005 | Taguchi | |
| 2005/0278584 A1 | 12/2005 | Asami et al. | |
| 2006/0059307 A1 | 3/2006 | Fujibayashi | |
| 2009/0100163 A1 * | 4/2009 | Tsao | 709/223 |

FOREIGN PATENT DOCUMENTS

| | | |
|---|---|---|
| EP | 1635241 | 3/2006 |
| FR | 2856810 | 12/2004 |
| JP | 10-333839 | 12/1998 |
| JP | 2000-112666 | 4/2000 |
| JP | 2005-031893 | 2/2005 |

OTHER PUBLICATIONS

European Search Report in European Patent Application No. 07251503.4-1245/1914625 mailed Jun. 7, 2010.

* cited by examiner

*Primary Examiner* — Larry Donaghue
(74) *Attorney, Agent, or Firm* — Brundidge & Stanger, P.C.

(57) ABSTRACT

In order to limit host computers permitted to control a storage area from host computers, provided is a storage management computer coupled to one or more host computers for providing services and one or more storage systems, in which the storage management computer judges whether the host computer is permitted to control the storage area based on data indicating the configuration information of the storage system and service management information for managing the services provided by the host computers, and in case of which it is judged that the host computer is permitted to control the storage area, the storage management computer sets access control data to permit the host computer to control the storage area.

19 Claims, 16 Drawing Sheets

| SERVICE IDENTIFIER | COMPUTER IDENTIFIER | ROLE OF COMPUTER |
|---|---|---|
| A | SERVER 1 | WEB SERVER |
| A | SERVER 2 | DATABASE |
| A | SERVER 3 | WEB SERVER |
| B | SERVER 4 | SERVICE AP |
| B | SERVER 5 | SERVICE AP |
| B | SERVER 6 | BACKUP |
| C | SERVER 7 | ARCHIVE |

| FIRST STORAGE SYSTEM IDENTIFIER 22001 | FIRST STORAGE AREA IDENTIFIER 22002 | SECOND STORAGE SYSTEM IDENTIFIER 22003 | SECOND STORAGE AREA IDENTIFIER 22004 | PAIR STATUS 22005 |
|---|---|---|---|---|
| STORAGE 1 | LDEV 1 | STORAGE 1 | LDEV 30 | Sync |
| STORAGE 1 | LDEV 40 | STORAGE 1 | LDEV 50 | Split |
| STORAGE 1 | LDEV 1 | STORAGE 2 | LDEV 3 | Sync |

*Fig.8*

| STORAGE SYSTEM IDENTIFIER 23001 | CONTROL TARGET STORAGE AREA IDENTIFIER 23002 | COMPUTER IDENTIFIER 23003 |
|---|---|---|
| STORAGE 1 | LDEV 1 | SERVER 2 |
| STORAGE 1 | LDEV 30 | SERVER 7 |

*Fig.9*

| ROLE OF COMPUTER 33001 | PERMITTED OPERATION 33002 |
|---|---|
| BACKUP | PAIR OPERATION |
| DATABASE | PAIR OPERATION |
| ARCHIVE | CHANGE OF ATTRIBUTE |

| STORAGE SYSTEM IDENTIFIER 24001 | CONTROL TARGET STORAGE AREA IDENTIFIER 24002 | COMPUTER IDENTIFIER 24003 | PERMITTED OPERATION 24004 |
|---|---|---|---|
| STORAGE 1 | LDEV 1 | SERVER 2 | PAIR OPERATION |
| STORAGE 1 | LDEV 30 | SERVER 7 | CHANGE OF ATTRIBUTE |

METHOD AND PROGRAM FOR SUPPORTING SETTING OF ACCESS MANAGEMENT INFORMATION

CLAIM OF PRIORITY

The present application claims priority from Japanese patent application 2006-283706 filed on Oct. 18, 2006, the content of which is hereby incorporated by reference into this application.

BACKGROUND

This invention relates to a computer system having a storage system, and more specifically, to a computer system for setting a table for managing a computer which permits operations to a storage area of the storage system.

Conventionally, there have been widely spread computer systems having a plurality of computers connected with a plurality of storage systems via a communication line (storage area network (SAN)), in which the highly reliable storage systems having high performance are shared by the plurality of computers.

As a function of security of the storage system, there is a function of limiting computers permitted to input/output data to/from a plurality of storage areas provided in the storage system as disclosed in JP 10-333839 A, for example.

The storage system creates a pair between the storage area provided in the storage system and a storage area other than this storage area. It becomes possible to duplicate data stored in a certain storage area to the other storage area composing the pair by creating the pair. It should be noted that as statuses of the pair, there are a synchronized state, suspended state, and the like. When the pair is synchronized, data stored in the original storage area is duplicated to the storage area of destination. When the pair is suspended, the data of the original storage area is not synchronized with that of the storage area of destination. Then, in a state where the pair is suspended, data stored in a storage area of a disk unit at a certain point of time is stored in a storage area composing the pair with that storage area, and data stored on and after that point is not reflected in the storage area of the destination. The pair is used for backing up data online, for example. The two storage areas composing the pair may be those provided in the same storage system or may be those provided in different storage systems, respectively.

There has also been a technique of storing electronic data in a storage system without archiving to a tape when a volume of the electronic data increases. The storage system is provided with a function of inhibiting writing to its storage area (function of changing attributes of the storage area) in order to store the data safely.

The computer connected with the storage system via the SAN controls the storage area set in the storage system. Controls carried out to the storage area by the computer include operations of changing the status of the pair, of inhibiting writing to the storage area, and the like. The storage system controls the storage area by inputting/outputting data to/from a special storage area by the computer as disclosed in JP 2000-112666 A, for example. It should be noted that this special storage area is called as a command device.

Similarly to the normal storage area, the command device limits computers for inputting/outputting data to/from the command device by an LUN Security function. Storage area operation requests from the computer include requests of changing the status of the pair, changing attributes of the storage area, and the like.

In recent years, there has been tried an introduction of an idea of business into management of operation of a computer system. In this management of operation, a relationship between services provided by the computer system and resources provided in the computer system such as a computer, a storage system, a network device, an application, database, and the like is defined in advance. Then, when a certain resource causes a failure, information indicating which service may be affected by the failure is displayed on an event monitoring console as disclosed in JP 2005-31893 A, for example.

SUMMARY

The computer system is composed of the plurality of computers and the plurality of storage systems, and provides services. Computers permitted to control the storage area are limited to computers that provide the same service. Accordingly, it becomes possible to prevent computers not related to the service from control the storage area. Thus, security of the service can be enhanced.

However, an administrator has to manage a computer that permits to control the storage area in addition to the configuration of the storage system, in order to limit the computers permitted to control the storage area to the computers providing the same service.

According to an aspect of this invention, there is provided a computer system comprising at least one host computer for providing services, at least one storage system coupled to the host computer, and a management computer, in which: the host computer has a first processor for carrying out arithmetic operations, a first memory connected to the first processor, and a first interface connected to the first processor; the first memory storing programs for providing service; the host computer provides the services by executing the programs and accesses to a storage area provided by the storage system via the first interface and a second interface provided in the storage system to control a storage area of the storage system; the storage system has a second processor for carrying out arithmetic operations, a second memory connected to the second processor, the storage area for storing data requested to be inputted and outputted from the host computer, and a second interface connected to the second processor; the second memory stores access control data for managing the host computer permitted to control the storage area; the management computer has a third processor for carrying out arithmetic operations, a third memory connected to the third processor, and a third interface connected to the third processor; the third memory storing configuration information indicating the configuration of the storage system and service management information for managing services provided by the host computer; the third processor judges whether the host computer is permitted to control the storage area based on the configuration information and service management information; and in case of which the third processor judges that the host computer is permitted to control the storage area, the third processor sets the access control data to permit the host computer to control the storage area via the second interface and the third interface.

This invention allows the security of the computer system to be improved without increasing cost for managing the storage system.

BRIEF DESCRIPTION OF THE DRAWINGS

The present invention can be appreciated by the description which follows in conjunction with the following figures, wherein:

FIG. 8 is a table showing a configuration of a pair management table according to the first embodiment of this invention;

FIG. 9 is a table showing a configuration of a control computer management table according to the first embodiment of this invention;

FIG. 21 is a table showing a configuration of a computer role management table according to a second embodiment of this invention; and FIG. 22 is a table showing a configuration of an access control table according to the second embodiment of this invention.

DETAILED DESCRIPTION OF THE PREFERRED EMBODIMENTS

First Embodiment

A first embodiment of this invention will be explained by using FIGS. 1 through 20.

Figure 1:
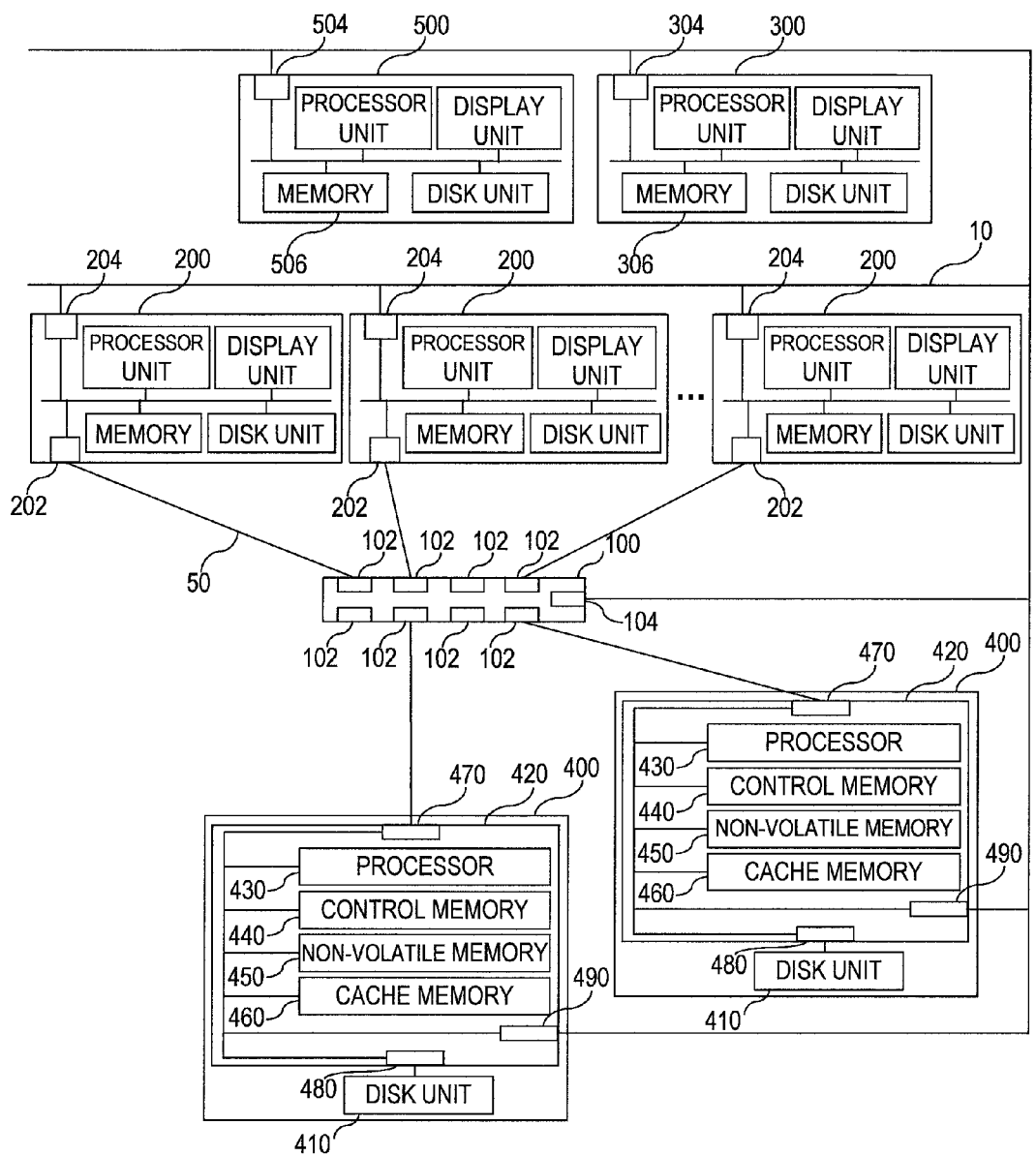
FIG. 1 is a diagram showing a computer system according to a first embodiment of this invention.

FIG. 1 is a diagram showing a computer system according to the first embodiment of this invention.

The computer system has host computers 200, a storage management computer 300, a service management computer 500, a fiber channel switch 100, and storage systems 400.

The host computers 200 are connected with the storage systems 400 via the fiber channel switch 100. The host computers 200, the storage management computer 300, the service management computer 500, and the storage systems 400 are mutually connected via a network 10.

The fiber channel switch 100 has fiber channel interfaces 102 and a network interface 104. The host computers 200 are connected with the storage systems 400 through the fiber channel interfaces 102. The fiber channel switch 100 is also connected with the network 10 via the network interface 104.

Each of the host computers 200 has a processor unit, a memory, a disk unit, a display unit, a fiber channel interface 202, and a network interface 204. The processor unit further includes a processor (e.g. CPU, not shown). The processor executes various arithmetic operations. The host computer 200 is connected with the fiber channel switch 100 through the fiber channel interface 202. The host computer 200 is also connected with the network 10 through the network interface 204.

The host computer 200 executes applications that provide services. The host computer 200 also transmits a request for inputting/outputting data to the storage system 400.

The storage management computer 300 has a processor unit, a memory 306, a disk unit, a display unit, and an interface 304 for connecting with the network 10. The processor unit has a processor (e.g. CPU, not shown). The processor executes various arithmetic operations. The storage management computer 300 manages the storage system 400 and the service management computer 500. To be specific, the storage management computer 300 manages accesses from the host computer 200 to the storage system 400.

The service management computer 500 has a processor unit, a memory 506, a disk unit, a display unit, and an interface 504 for connecting with the network 10. The service management computer 500 manages services provided by the computer system and the host computer 200 composing the services.

The services may be those conducted within a company or those provided to clients, for example. The services conducted within the company may be those of personnel management, calculation of salary, and ordering of materials, for example. The services provided to the clients may be those provided through Web system typified by Internet banking and Internet shopping, for example. It should be noted that the host computer 200 is a computer for executing applications necessary for providing the services.

The storage system 400 has a storage controller 420 and a disk unit 410.

The storage controller 420 has a processor 430, a control memory 440, a non-volatile memory 450, a cache memory 460, a first fiber channel interface 470, a second fiber channel interface 480, and a network interface 490. It should be noted that these are connected with each other.

The storage controller 420 is connected with the disk unit 410 via the second fiber channel interface 480. It should be noted that the second fiber channel interface 480 may not be the fiber channel interface, and may be an interface of ATA, serial ATA, parallel SCSI, serial SCSI, and the like.

The disk unit 410 has a recording medium (not shown). The disk unit 410 reads/writes data from/to the recording medium by receiving a request to input/output data from the storage controller 420. The storage controller 420 transmits the request to input/output data to the disk unit 410 via the second fiber channel interface 480.

The storage controller 420 can control the disk unit 410 as RAID having redundancy. Accordingly, reliability of the storage system 400 is improved and performance of the storage system 400 is enhanced.

It should be noted that a single or a plurality of disk units 410 may be provided in the storage system 400.

Physical or logical storage areas (volume of physical volume or logical volume, for example) are set in the disk unit 410. It should be noted that this storage area is a physical or logical storage area. The storage area is uniquely identified within the storage system 400 by a storage area identifier.

The storage controller 420 is connected with the fiber channel switch 100 via the first fiber channel interface 470.

The storage controller 420 receives the request to input/output data from the host computer 200 connected with the fiber channel switch 100 via the first fiber channel interface 470.

The storage controller 420 is connected with the network 10 via the network interface 490.

Speed of data transferred between the disk unit 410 and the storage controller 420 is slower than speed of data transferred within the storage controller 420. Therefore, the storage controller 420 stores data frequently accessed in the cache memory 460. Accordingly, performance of transferring data of the storage system 400 is improved.

The operation of the storage system 400 described above is realized when a program stored in the non-volatile memory 450 is loaded to the control memory 440, and the processor 430 executes the loaded program.

It should be noted that the storage controller 420 may be a single processor or a multiple processor.

Figure 2:
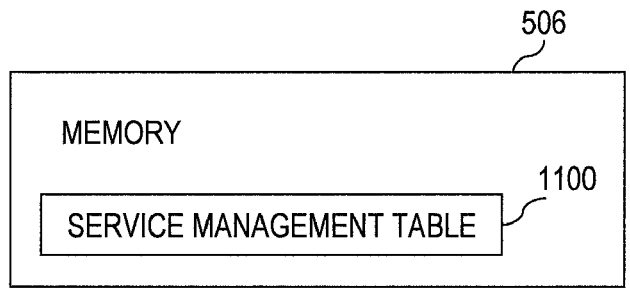
FIG. 2 is a diagram for explaining a memory provided in a service management computer according to the first embodiment of this invention.

FIG. 2 is a diagram for explaining a memory 506 provided in the service management computer 500 according to the first embodiment of this invention.

A service management table 1100 is stored in the memory 506. The service management table 1100 is a table includes information for managing services provided by the host computers 200 provided in the computer system and the host computers 200 that provide the services. It should be noted that the detail of the service management table 1100 will be explained with reference to FIG. 5.

Figure 3:
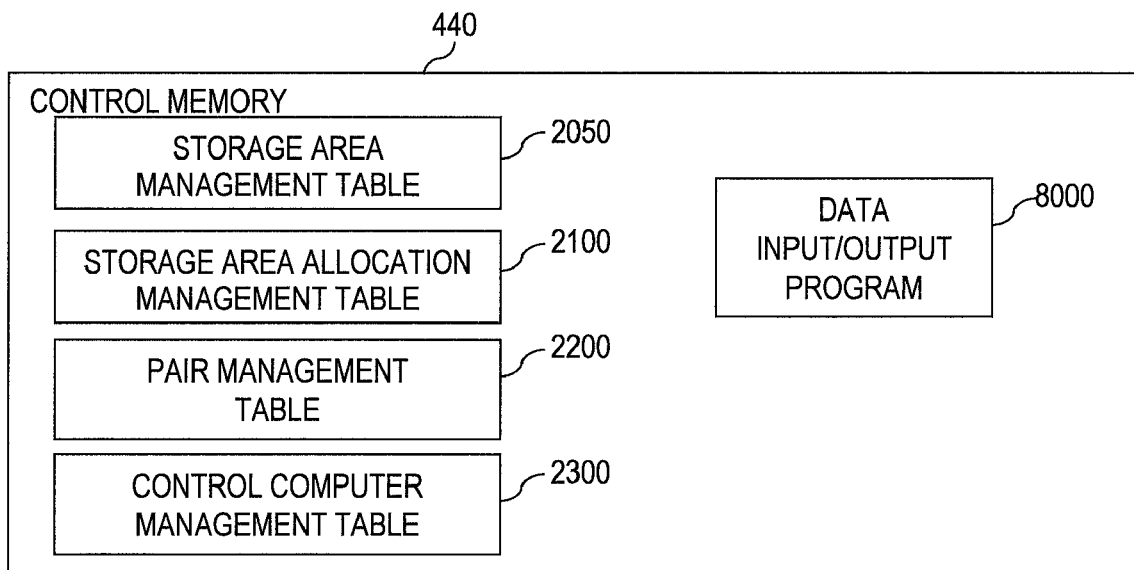
FIG. 3 is a diagram for explaining a control memory provided in a storage system according to the first embodiment of this invention.

FIG. 3 is a diagram for explaining the control memory 440 provided in the storage system 400 according to the first embodiment of this invention.

The control memory 440 stores a storage area management table 2050, a storage area allocation management table 2100, a pair management table 2200, a control computer management table 2300, and a data input/output program 8000.

The storage area management table 2050 includes information for managing attributes and the like of the storage areas set in the storage system 400. It should be noted that the detail of the storage area management table 2050 will be explained with reference to FIG. 6.

The storage area allocation management table 2100 includes information indicating whether the storage area accessible from the host computer is a storage area via that the storage area can be controlled (referred to as "command device" hereinafter). The command device is an area into which a command to control the storage area is written from the host computer 200. Then, when a command is written into the command device, the storage system 400 controls the storage area designated by the written command. It should be noted that the detail of the storage area allocation management table 2100 will be explained with reference to FIG. 7.

The pair management table 2200 includes information for managing storage areas composing the pair and status of the pair. It should be noted that the detail of the pair management table 2200 will be explained with reference to FIG. 8.

The control computer management table 2300 includes information for managing the storage area which is able to be controlled by the host computer 200 via the command device. It should be noted that the detail of the control computer management table 2300 will be explained with reference to FIG. 9.

The data input/output program 8000 is executed when the storage system 400 receives the request to input/output data from the host computer 200. It should be noted that the detail of the data input/output program 8000 will be explained with reference to FIG. 10.

Figures 4, 5:
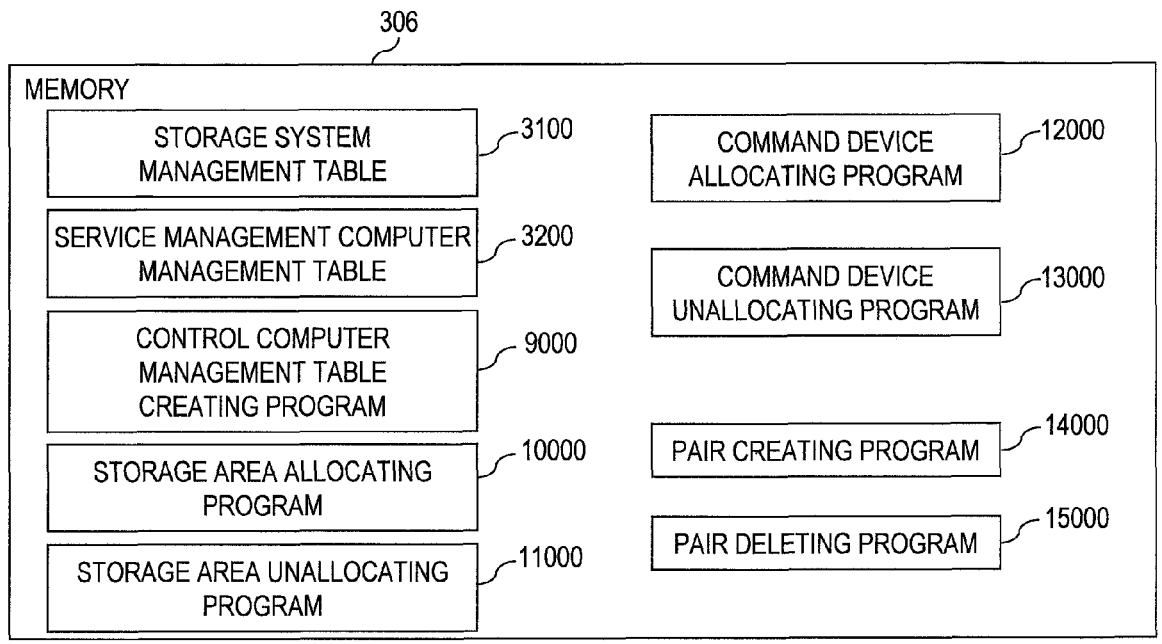
FIG. 4 is a diagram for explaining a memory provided in a storage management computer according to the first embodiment of this invention.
FIG. 5 is a table showing a configuration of a service management table according to the first embodiment of this invention.

FIG. 4 is a diagram for explaining the memory 306 provided in the storage management computer 300 according to the first embodiment of this invention.

The memory 306 stores a storage system management table 3100, a service management computer management table 3200, a control computer management table creating program 9000, a storage area allocating program 10000, a storage area unallocating program 11000, a command device allocating program 12000, a command device unallocating program 13000, a pair creating program 14000, and a pair deleting program 15000.

The storage system management table 3100 includes information for managing the storage system 400 managed by the storage management computer 300. It should be noted that the detail of the storage system management table 3100 will be explained with reference to FIG. 12.

The service management computer management table 3200 includes information for managing the service management computer 500. It should be noted that the detail of the service management computer management table 3200 will be explained with reference to FIG. 13.

The control computer management table creating program 9000 creates the control computer management table 2300. It should be noted that the detail of processes of the control computer management table creating program 9000 will be explained with reference to FIG. 14.

The storage area allocating program 10000 executes processes for updating the control computer management table 2300 when the storage area is allocated to the host computer 200. It should be noted that the detail of processes of the storage area allocating program 10000 will be explained with reference to FIG. 15.

The storage area unallocating program 11000 executes processes for updating the control computer management table 2300 when the relationship of allocation between the storage area and the host computer 200 is freed. It should be noted that the detail of processes of the storage area unallocating program 11000 will be explained with reference to FIG. 16.

The command device allocating program 12000 executes processes for updating the control computer management table 2300 when the storage area is allocated to the host computer 200 as the command device. It should be noted that the detail of processes of the command device allocating program 12000 will be explained with reference to FIG. 17.

The command device unallocating program 13000 executes processes for updating the control computer management table 2300 when the relationship of allocation as the command device between the storage area and the host computer 200 is freed. It should be noted that the detail of processes of the command device unallocating program 13000 will be explained with reference to FIG. 18.

The pair creating program 14000 executes processes for updating the control computer management table 2300 when a pair is created. It should be noted that the detail of processes of the pair creating program 14000 will be explained with reference to FIG. 19.

The pair deleting program 15000 executes processes for updating the control computer management table 2300 when a pair is deleted. It should be noted that the detail of processes of the pair deleting program 15000 will be explained with reference to FIG. 20.

FIG. 5 is a table showing a configuration of the service management table 1100 according to the first embodiment of this invention.

The service management table 1100 includes columns of a service identifier 11001, a computer identifier 11002, and a role-of-computer 11003.

An identifier unique to a service provided by the computer system is registered in the column of the service identifier 11001. An identifier unique to the host computer 200 that provides the service is registered in the column of the computer identifier 11002. A name of a role of the host computer 200 that provides the service is registered in the column of the role-of-computer 11003. To be concrete, a name of application executed by the host computer 200 to provide the service is registered in the column of the role-of-computer 11003.

To be specific, service A is composed of a server 1, a server 2, and a server 3. The server 1 executes an application for providing a service as a WEB server. The server 2 executes an application for providing a service as database. The server 3 executes an application for providing a service as a WEB server. It should be noted that the service A is that of online shopping site, for example.

Figure 6:
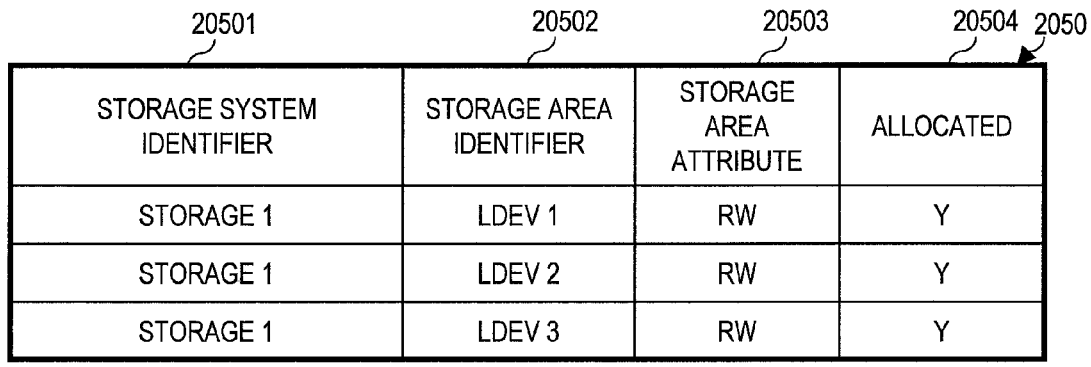
FIG. 6 is a table showing a configuration of a storage area management table according to the first embodiment of this invention.

FIG. 6 is a table showing a configuration of the storage area management table 2050 according to the first embodiment of this invention.

The storage area management table 2050 includes columns of a storage system identifier 20501, a storage area identifier 20502, a storage area attribute 20503, and an "allocated" 20504.

An identifier unique to the storage system 400 storing the storage area management table 2050 is registered in the column of the storage system identifier 20501.

An identifier of the storage area set in the storage system 400 is registered in the column of the storage area identifier 20502. It should be noted that the identifier of this storage area only needs to be unique within the storage system 400 in which the storage area is set.

Information indicating attributes of the storage area is registered in the column of the storage area attribute 20503. To be specific, "RW", "R", or the like is registered in the column of the storage area attribute 20503. When "RW" is registered in the column of the storage area attribute 20503, the storage area identified by the identifier registered in the column of the storage area identifier 20502 of the entry is a storage area to which reading/writing of data is permitted. When "R" is registered in the column of the storage area attribute 20503, the storage area identified by the identifier registered in the column of the storage area identifier 20502 of the entry is a storage area to which only the reading of data is permitted. It should be noted that the storage area attribute 20503 can be set by the host computer 200 via the command device. This point will be detailed with reference to FIG. 10.

Information indicating whether a storage area is allocated to the host computer 200 is registered in the column of the "allocated" 20504. When "Y" is registered in the column of the "allocated" 20504, it indicates that the storage area identified by the storage area identifier 20502 of the entry is allocated to the host computer 200. It should be noted that when "N" is registered in the column of the "allocated" 20504, it indicates that the storage area identified by the storage area identifier 20502 of the entry is not allocated to the host computer 200.

Figure 7:
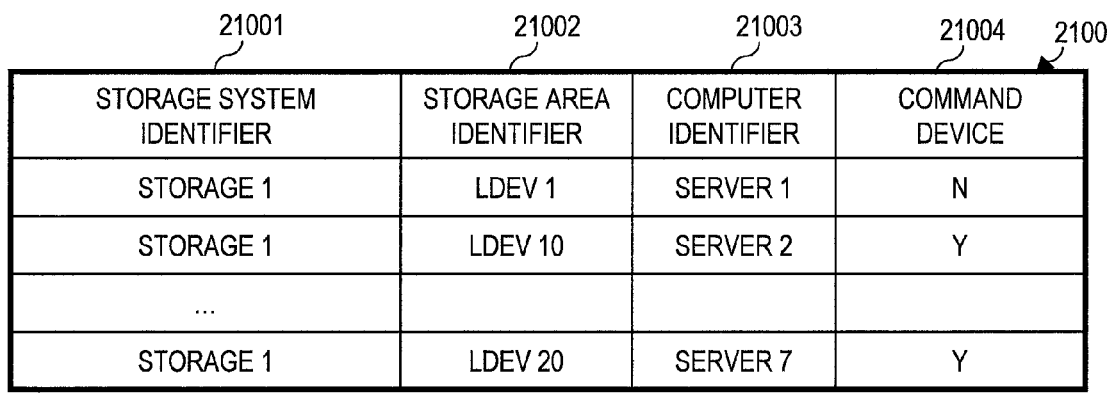
FIG. 7 is a table showing a configuration of a storage area allocation management table according to the first embodiment of this invention.

FIG. 7 is a table showing a configuration of the storage area allocation management table 2100 according to the first embodiment of this invention.

The storage area allocation management table 2100 includes columns of a storage system identifier 21001, a storage area identifier 21002, a computer identifier 21003, and a command device 21004.

An identifier unique to the storage system 400 storing the storage area allocation management table 2100 is registered in the column of the storage system identifier 21001.

An identifier of the storage area set in the storage system 400 is registered in the column of the storage area identifier 21002. It should be noted that the identifier of this storage area only needs to be unique within the storage system 400 in which the storage area is set.

An identifier of the host computer 200 that can input/output data to/from the storage area identified by the identifier registered in the storage area identifier 21002 of the entry is registered in the column of the computer identifier 21003.

Information indicating whether the storage area identified by the identifier registered in the column of the storage area identifier 21002 of the entry is a command device is registered in the column of the command device 21004. When "Y" is registered in the column of the command device 21004, it indicates that the storage area identified by the identifier registered in the column of the storage area identifier 21002 of the entry is a command device. When "N" is registered in the column of the command device 21004, it indicates that the storage area identified by the identifier registered in the column of the storage area identifier 21002 is not a command device.

It should be noted that when the host computer 200 writes data into the storage area which is the command device, the storage system 400 construes that the written data is a control command. Then, the host computer 200 controls the storage area designated as a control target. It should be noted that the storage area designated as the control target must be a storage area registered in the control computer management table 2300. It should be noted that this point will be detailed in processes of the data input/output program 8000 in FIG. 10.

FIG. 8 is a table showing a configuration of the pair management table 2200 according to the first embodiment of this invention.

The pair management table 2200 is set when the administrator sets a storage area to be paired with a certain storage area.

The pair management table 2200 includes columns of a first storage system identifier 22001, a first storage area identifier 22002, a second storage system identifier 22003, a second storage area identifier 22004, and a pair status 22005.

An identifier unique to the storage system 400 in which a storage area of duplication source is set is registered in the column of the first storage system identifier 22001.

An identifier of the storage area of duplication source is registered in the column of the first storage area identifier 22002. It should be noted that the identifier of the storage area only needs to be unique within the storage system 400 in which the storage area is set.

An identifier unique to the storage system 400 in which a storage area of destination of duplication is set is registered in the column of the second storage system identifier 22003.

An identifier of the storage area of destination of duplication is registered in the column of the second storage area identifier 22004. It should be noted that the identifier of the storage area only needs to be unique within the storage system 400 in which the storage area is set.

In other words, data stored in the storage area identified by the identifier registered in the column of the first storage system identifier 22001 and the identifier registered in the column of the first storage area identifier 22002 is duplicated to the storage area identified by the identifier registered in the column of the second storage system identifier 22003 and the identifier registered in the column of the second storage area identifier 22004.

When data is written into the storage area identified by the identifier registered in the column of the first storage system identifier 22001 and the identifier registered in the column of the first storage area identifier 22002, the storage system 400 writes the same data as the written data into the storage area identified by the identifier registered in the column of the second storage system identifier 22003 and the identifier registered in the column of the second storage area identifier 22004. Accordingly, the pieces of data may be synchronized between the storage areas.

Information indicating the status of the pair is registered in the column of the pair status 22005. To be specific, "Sync", "Split", or the like is registered in the column of the pair status 22005.

When "Sync" is registered in the column of the pair status 22005, it indicates that the pieces of data are synchronized between the storage areas. When "Split" is registered in the column of the pair status 22005, it indicates a state in which the synchronization of the pieces of data is stopped between the storage areas. In other words, the data stored in the storage area identified by the identifier registered in the column of the first storage system identifier 22001 and the identifier registered in the column of the first storage area identifier 22002 at a certain time point is held in the storage area identified by the identifier registered in the column of the first storage system identifier 22001 and the identifier registered in the column of the first storage area identifier 22002.

It should be noted that the pair status 22005 is set when the administrator sets the pair management table 2200 by using the storage management computer 300. There is also a case where the pair status 22005 is set when the storage area is controlled by the data input/output request from the host computer 200 to the storage area which is the command device. It should be noted that this point will be detailed with reference to FIG. 10.

FIG. 9 is a table showing a configuration of the control computer management table 2300 according to the first embodiment of this invention.

The control computer management table 2300 includes columns of a storage system identifier 23001, a control target storage area identifier 23002, and a computer identifier 23003.

An identifier unique to the storage system 400 that stores the control computer management table 2300 is registered in the column of the storage system identifier 23001.

An identifier of the storage area which is able to be controlled by the host computer 200 identified by the identifier registered in the column of the computer identifier 23003 of the entry via the storage area of the command device is registered in the column of the control target storage area identifier 23002. It should be noted that this identifier of the storage area only needs to be unique within the storage system 400 in which the storage area is set.

An identifier unique to the host computer 200 capable of operating the storage area identified by the identifier registered in the column of the control target storage area identifier 23002 of the entry via the storage area of the command device is registered in the column of the computer identifier 23003.

The host computer 200 can only control the storage area registered in the column of the control target storage area identifier 23002 of the entry of the identifier of that computer 200.

It should be noted that the data input/output program 8000 refers to the control computer management table 2300. This point will be explained in connection with processes of the data input/output program 8000 shown in FIG. 10.

Next, the processes of the data input/output program 8000 will be explained with reference to FIG. 10.

Figure 10:
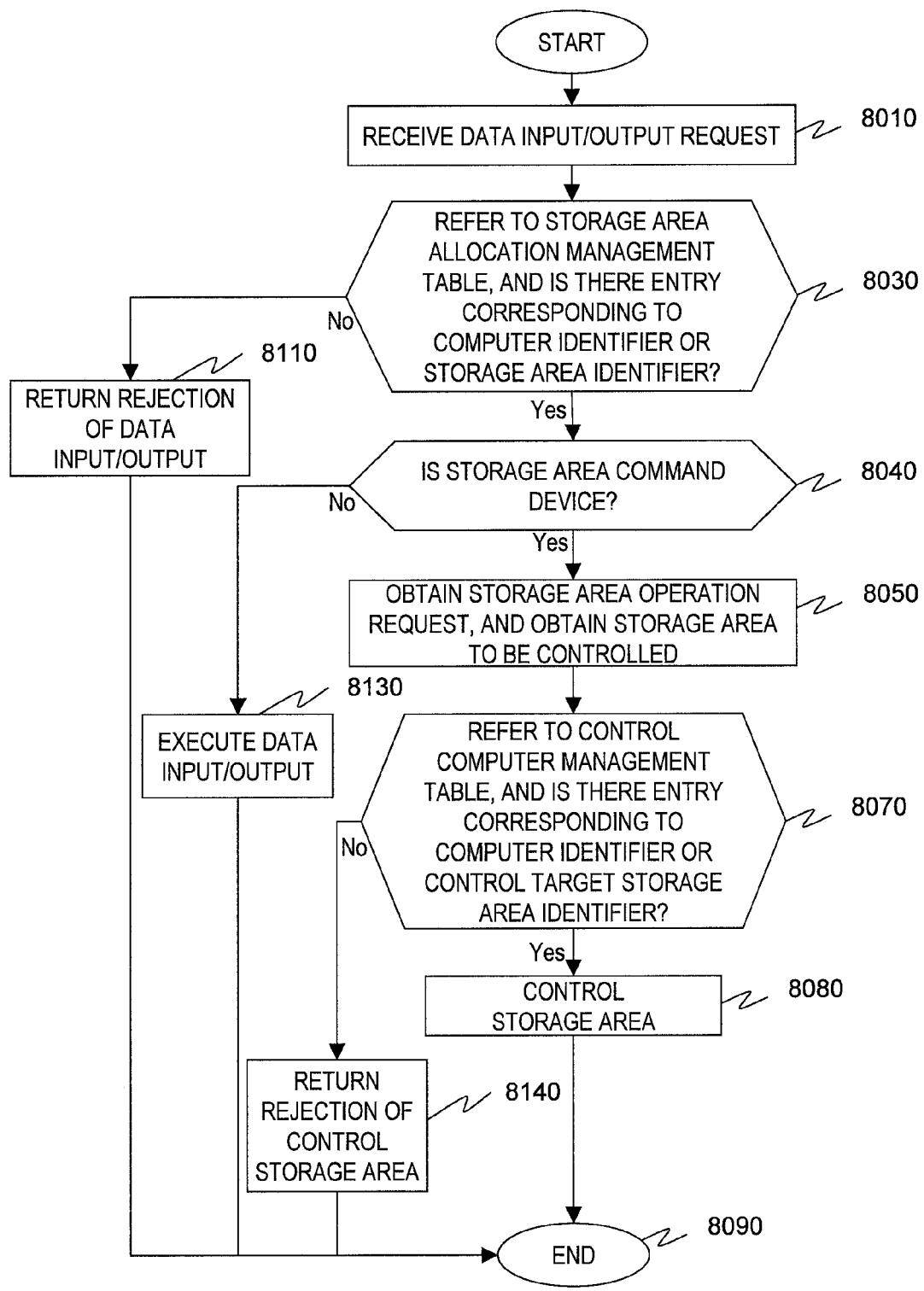
FIG. 10 is a flowchart of processes of a data input/output program according to the first embodiment of this invention.

FIG. 10 is a flowchart of the processes of the data input/output program 8000 according to the first embodiment of this invention.

The specific storage area (command device) for enabling the host computer 200 to control the storage area is set in the storage system 400. The command device is set when the administrator sets the command device 21004 included in the storage area allocation management table 2100 via the storage management computer 300.

The storage system 400 processes the data input/output request from the host computer 200 to the command device as a storage area operation request.

The data input/output program 8000 is executed by the processor 430.

The storage system 400 receives the data input/output request to the storage area transmitted by host computers 200 via the first fiber channel interface 470 in Step 8010. It should be noted that the data input/output request contains the identifier of the host computer 200 that transmits the data input/output request and the identifier of the storage area that is to be a target of data input/output. When the storage area that is the target of data input/output is the command device, the data input/output request contains the storage area operation request. The storage area operation request contains the identifier of the control target storage area that is the target to be controlled via the command device, and contents of operation to the control target storage area.

The data input/output program 8000 refers to the storage area allocation management table 2100 to judge whether there exists an entry coincident with the identifier of the host computer 200 that has transmitted the data input/output request and the identifier of the storage area to be the target of the data input/output in Step 8030.

To be specific, the data input/output program 8000 judges whether there exists the entry, among entries registered in the storage area allocation management table 2100, whose identifier registered in the computer identifier 21003 coincides with the identifier of the host computer 200 that transmits the data input/output request, and whose identifier registered in the storage area identifier 21002 coincides with the identifier of the storage area that is the target of the data input/output.

When the data input/output program 8000 judges that there exists no entry that coincides with the identifier of the host computer 200 that has transmitted the data input/output request and the identifier of the storage area that is the target of the data input/output in the process of Step 8030, it transmits a response to reject the data input/output to the host computer 200 that has transmitted the data input/output request in Step 8110, and ends the processes of the data input/output program 8000 in Step 8090.

When the data input/output program 8000 judges that there exists an entry that coincides with the identifier of the host computer 200 that has transmitted the data input/output request and the identifier of the storage area that is the target of the data input/output in the process of Step 8030, it judges whether the storage area that is the target of the data input/output is the command device in Step 8040.

To be specific, the data input/output program 8000 refers to the storage area allocation management table 2100 to judge whether "Y" is registered in the command device 21004 of the entry coincident with the identifier of the host computer 200 that has transmitted the data input/output request and the identifier of the storage area that is the target of the data input/output.

When the data input/output program 8000 judges that the storage area that is the target of the data input/output is not the command device in the process of Step 8040, the data input/output program 8000 executes the data input/output with respect to the storage area that is the target of the data input/output in Step 8130, and ends the processes of the data input/output program 8000 in Step 8090.

On the other hand, when the data input/output program 8000 judges that the storage area that is the target of the data input/output is the command device in the process of Step 8040, the data input/output program 8000 obtains the storage area operation request contained in the data input/output request received in the process of Step 8010. Then, the data input/output program 8000 obtains an identifier of the control target storage area from the obtained storage area operation request in Step 8050.

Next, the data input/output program 8000 refers to the control computer management table 2300 to judge whether there exists an entry coincident with the identifier of the host computer 200 that has transmitted the data input/output request and the identifier of the control target storage area obtained in the process of Step 8050 in Step 8070.

To be specific, the data input/output program 8000 judges whether there exists an entry, among entries registered in the control computer management table 2300, whose identifier registered in the computer identifier 23003 coincides with the identifier of the host computer 200 that has transmitted the data input/output request, and whose identifier registered in the control target storage area identifier 23002 coincides with the identifier of the control target storage area obtained in the process of Step 8050.

When the data input/output program 8000 judges that there exists no entry coincident with the identifier of the host computer 200 that has transmitted the data input/output request and the identifier of the control target storage area obtained in the process of Step 8050, the host computer that has transmitted the data input/output request is the host computer 200 that is not permitted to control the control target storage area. Accordingly, the data input/output program 8000 transmits a response to reject the operation of the storage area to the host computer 200 that has transmitted the data input/output request in Step 8140, and ends the processes of the data input/output program 8000 in Step 8090.

When the data input/output program 8000 judges that there exists the entry that coincides with the identifier of the host computer 200 that has transmitted the data input/output request and the identifier of the control target storage area obtained in the process of Step 8050 in the process of Step 8070, the host computer that has transmitted the data input/output request is the host computer 200 that is permitted to control the target storage area. Accordingly, the data input/output program 8000 controls the target storage area in Step 8080, and ends the processes of the data input/output program 8000 in Step 8090.

When the control of the target storage area is an operation for changing the pair status, for example, the data input/output program 8000 changes information registered in the pair status 22005 of the entry whose identifier registered in the storage area identifier 21002, among the entries registered in the pair management table 2200, coincides with the identifier of the control target storage area in the process of Step 8080.

When the control of the target storage area is an operation of changing the attribute of the storage area, for example, the data input/output program 8000 changes information registered in a storage area attribute 2053 of the entry whose identifier registered in the storage area identifier 20502, among the entries registered in the storage area management table 2050, coincides with the identifier of the control target storage area.

Next, a case where the administrator changes the configuration of the storage system 400 by using the storage management computer 300 will be explained.

The storage management computer 300 can access the service management table 1100 stored in the service management computer 500 via the network 10. The storage management computer 300 can also access the storage area management table 2050, the storage area allocation management table 2100, the pair management table 2200, and the control computer management table 2300 stored in the storage system 400 via the network 10.

Then, the storage management computer 300 changes the configuration of the storage system 400 based on instructions of the administrator.

Examples of changing the configuration of the storage system 400 include allocation of the storage area to the host computer 200, unallocation of the storage area allocated to the host computer 200, allocation of command device to the host computer 200, unallocation of the command device allocated to the host computer 200, creation of the pair between the storage areas, and deletion of the pair between the storage areas.

The administrator instructs the storage management computer 300 to change the configuration of the storage system by using a graphical user interface (GUI) provided by the storage management computer 300, for example.

Figure 11:
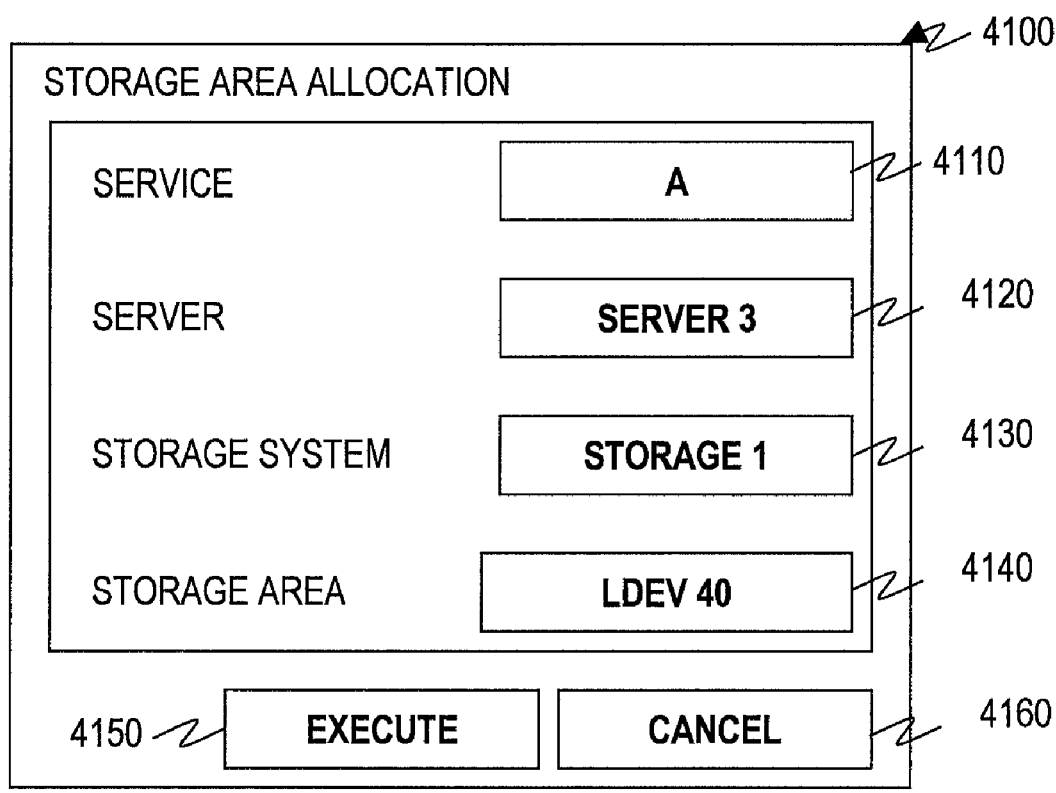
FIG. 11 is a diagram for explaining a storage area allocation GUI provided by the storage management computer in allocating a storage area to the host computer according to the first embodiment of this invention.

FIG. 11 is a table for explaining a storage area allocation GUI 4100 provided by the storage management computer 300 in allocating the storage area to the host computer 200 according to the first embodiment of this invention.

The storage area allocation GUI 4100 contains a service selecting column 4110, a server selecting column 4120, a storage system selecting column 4130, a storage area selecting column 4140, an execute button 4150, and a cancel button 4160.

The administrator can select one service provided in the computer system in the service selecting column 4110. In other words, the administrator select one service out of services identified by identifiers registered in the service identifier 11001 contained in the service management table 1100 in the service selecting column 4110.

The administrator also selects one computer 200 composing the service selected in the service selecting column 4110 in the server selecting column 4120. In other words, the administrator selects one computer 200 out of the host computers 200 identified by identifiers registered in the computer identifier 11002 of the entry in which the identifier registered in the service identifier 11001 coincides with the identifier of the service selected in the service selecting column 4110 in the server selecting column 4120.

The administrator further selects one storage system 400 provided in the computer system in the storage system selecting column 4130. In other words, the administrator selects one storage system 400 out of the storage systems 400 identified by the identifiers registered in the storage system identifier 31001 contained in the storage system management table 3100 stored in the storage management computer 300 in the storage system selecting column 4130.

The administrator also selects one storage area set in the storage system 400 selected in the storage system selecting column 4130 in the storage area selecting column 4140. In other words, the administrator selects one storage area out of the storage areas identified by the identifiers registered in the storage area identifier 20502 contained in the storage area management table 2050 stored in the storage system 400 selected in the storage system selecting column 4130 in the storage area selecting column 4140.

Then, when the administrator operates an execute button 4150, a new entry is added to the storage area allocation management table 2100 stored in the storage system 400 selected in the storage system selecting column 4130.

To be specific, the identifier of the storage area selected in the storage area selecting column 4140 is registered in the storage area identifier 21002. The identifier of the host computer 200 selected in the server selecting column 4120 is registered in the computer identifier 21003. It should be noted that "N" is registered in the command device 21004. When the storage area allocation GUI 4100 is a GUI for allocating the command device to the host computer 200, "Y" is registered in the command device 21004.

When the cancel button 4160 is operated, the content selected in each selecting column is canceled.

In the example shown in FIG. 11, when the execute button 4150 is operated, the storage area "LDEV 40" of the storage system "STORAGE 1" is newly allocated to the server "SERVER 3" that provides the service "A".

Figure 12:
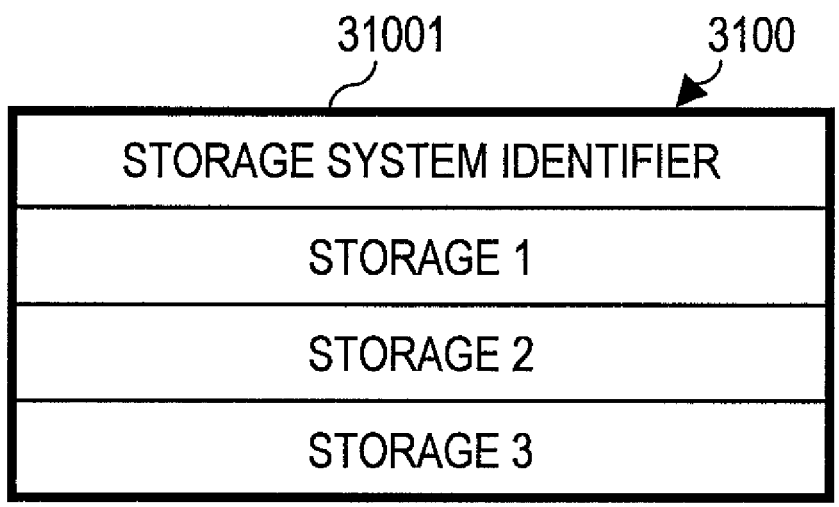
FIG. 12 is a table showing a configuration of a storage system management table according to the first embodiment of this invention.

FIG. 12 is a table showing a configuration of a storage system management table 3100 according to the first embodiment of this invention.

Identifiers unique to all storage systems 400 managed by the storage management computer 300 are registered in the storage system management table 3100.

The identifiers of all storage systems 400 provided in the computer system can be obtained by making a reference to the storage system management table 3100.

Figure 13:
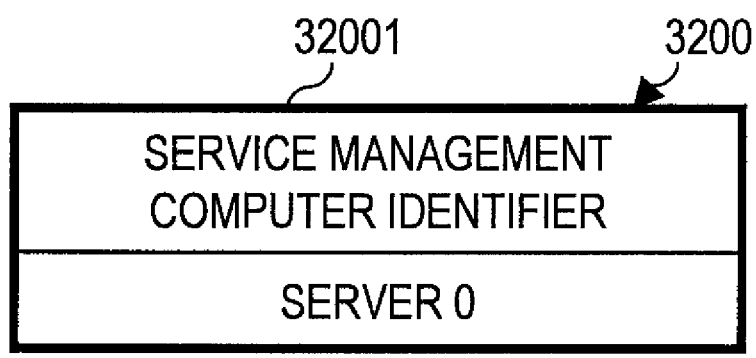
FIG. 13 is a table showing a configuration of a service management computer management table according to the first embodiment of this invention.

FIG. 13 is a table showing a configuration of the service management computer management table 3200 according to the first embodiment of this invention.

The service management computer management table 3200 contains a column of a service management computer identifier 32001.

An identifier of the service management computer 500 managed by the storage management computer 300 is registered in the service management computer identifier 32001.

The identifier of the service management computer 500 for managing services can be obtained by making a reference to the service management computer management table 3200. When the storage management computer 300 refers to the service management table 1100 stored in the service management computer 500, it refers to the service management computer management table 3200 to obtain the identifier of the service management computer 500 storing the service management table 1100 to be referred to.

Next, processes of the control computer management table creating program 9000 will be explained with reference to FIG. 14.

Figure 14:
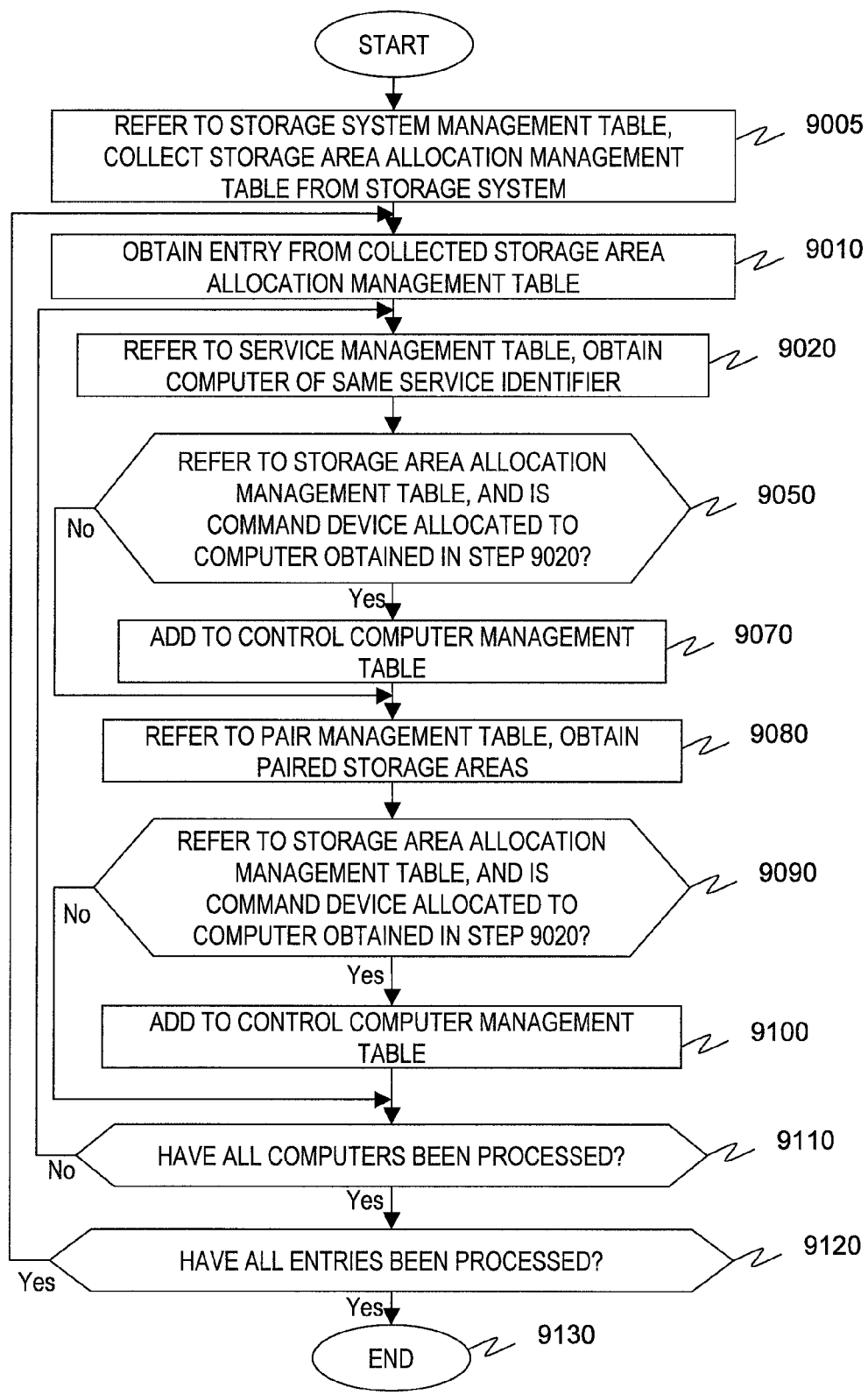
FIG. 14 is a flowchart of processes of a control computer management table creating program according to the first embodiment of this invention.

FIG. 14 is a flowchart of the processes of the control computer management table creating program 9000 according to the first embodiment of this invention.

When the function of enabling the host computer 200 to control the storage area via the command device is introduced to the storage system 400, the control computer management table creating program 9000 is executed on the storage management computer 300. Then, a control computer management table 2300 is created by executing the control computer management table creating program 9000.

The control computer management table creating program 9000 stored in the disk unit provided in the storage management computer 300 is loaded to the memory 306 and is executed by the processor unit.

When the control computer management table creating program 9000 is executed, the control computer management table creating program 9000 refers to the storage system management table 3100 to obtain the identifier registered in the storage system identifier 31001. Then, the control computer management table creating program 9000 collects the storage area allocation management table 2100 stored in the storage system 400 identified by the obtained identifier, and stores the storage area allocation management table 2100 in the memory 306 in Step 9005. The control computer management table creating program 9000 obtains all of the entries registered in the storage area allocation management table 2100 collected in the process of Step 9005 in Step 9010. The respective entries obtained include an identifier registered in the storage system identifier 21001, an identifier registered in the storage area identifier 21002, and an identifier registered in the computer identifier 21003.

It should be noted that the control computer management table creating program 9000 selects one entry out of all of the obtained entries in the process of Step 9010.

Next, the control computer management table creating program 9000 refers to the service management table 1100 to obtain the identifier of the host computer 200 that provides the same service as that of the host computer 200 identified by the identifier registered in the computer identifier 21003 contained in the entry selected in the process of Step 9010 in Step 9020. It should be noted that when the control computer management table creating program 9000 refers to the service management table 1100, the control computer management table creating program 9000 obtains the service management table 1100 stored in the service management computer 500 and stores service management table 1100 in the memory 306.

To be specific, the control computer management table creating program 9000 obtains the identifier of the service registered in the service identifier 11001 of the entry whose identifier registered in the computer identifier 11002, among entries registered in the service management table 1100, coincides with the identifier registered in the computer identifier 21003 contained in the entry selected in the process of Step 9010.

Then, the control computer management table creating program 9000 obtains identifiers of all computers 200 registered in the computer identifier 11002 contained in the entry whose identifier of the service registered in the service identifier 11001 coincides with the obtained identifier of the service among the entries registered in the service management table 1100.

It should be noted that in the process of Step 9020, the control computer management table creating program 9000 selects the identifier of one computer 200 out of the obtained identifiers of all computers 200 that provide the same services.

Next, the control computer management table creating program 9000 refers to the storage area allocation management table 2100 collected in the process of Step 9005 to judge whether the command device is allocated to the host computer 200 identified by the identifier selected in the process of Step 9020 in Step 9050.

To be specific, the control computer management table creating program 9000 refers to the storage area allocation management table 2100 in which the identifier registered in the storage system identifier 21001 coincides with the identifier to be registered in the storage system identifier 21001 contained in the entry selected in the process of Step 9010 out of the entries stored in the storage area allocation management table 2100 collected in the process of Step 9005.

Then, the control computer management table creating program 9000 judges whether "Y" is registered in the command device 21004 of the entry in which the identifier registered in the computer identifier 21003 coincides with the identifier of the host computer 200 obtained in the process of Step 9020 out of the entries stored in the storage area allocation management table 2100 to be referred to.

When it is judged in the process of Step 9050 that the command device is not allocated to the host computer 200 identified by the identifier selected in the process of Step 9020, the control computer management table creating program 9000 advances to a process of Step 9080.

On the other hand, when it is judged in the process of Step 9050 that the command device is allocated to the host computer 200 identified by the identifier selected in the process of Step 9020, the host computer 200 to which the command device is allocated is the host computer 200 that is permitted to control the storage area allocated to the host computer 200 that provides the same service as the host computer 200. Accordingly, the control computer management table creating program 9000 registers the identifier of the storage area contained in the entry selected in the process of Step 9010 and the identifier of the host computer 200 judged to have been allocated with the command device in the process of Step 9050 in the control computer management table 2300 in Step 9070, and advances to the process of Step 9080.

To be specific, the control computer management table creating program 9000 registers the identifier of the storage area contained in the entry selected in the process of Step 9010 in the control target storage area identifier 23002. Then, the control computer management table creating program 9000 registers the identifier of the host computer 200 judged to have been allocated with the command device in the process of Step 9050 in the computer identifier 23003.

Next, the control computer management table creating program 9000 refers to the pair management table 2200 stored in the storage system 400 identified by the identifier registered in the storage system identifier 21001 contained in the entry selected in the process of Step 9010. Then, the control computer management table creating program 9000 obtains an identifier of a storage area composing a pair with the storage area identified by the identifier registered in the storage area identifier 21002 contained in the entry selected in the process of Step 9010 in Step 9080.

The control computer management table creating program 9000 refers to the storage area allocation management table 2100 collected in the process of Step 9005. Then, the control computer management table creating program 9000 judges whether the command device is allocated to the host computer 200 identified by the identifier selected in the process of Step 9020 in Step 9090. It should be noted that because a concrete process of Step 9090 is the same as the process of Step 9050, explanation thereof will be omitted.

When it is judged that no command device is allocated to the host computer 200 identified by the identifier selected in the process of Step 9020 in the process of Step 9090, the process advances to Step 9110.

When it is judged in the process of Step 9090 that the command device is allocated to the host computer 200 identified by the identifier selected in the process of Step 9020, the host computer 200 to which the command device is allocated is the host computer 200 permitted to control the storage area that is allocated to the host computer 200 that provides the same service as the host computer 200 and that composes the pair with the storage area set in the storage system 400 to which the command device is set. Accordingly, the control computer management table creating program 9000 registers the identifier of the storage area obtained in the process of Step 9080 and the identifier of the host computer 200 judged to have been allocated with the command device in the process of Step 9090 to the control computer management table 2300 in Step 9100 to advance to a process of Step 9110.

To be specific, the control computer management table creating program 9000 registers the identifier of the storage area obtained in the process of Step 9080 to the control target storage area identifier 23002. Then, the control computer management table creating program 9000 registers the identifier of the host computer 200 judged to have been allocated with the command device in the process of Step 9090 to the computer identifier 23003.

Next, the control computer management table creating program 9000 judges whether the processes of Steps 9050 to 9100 have been executed to the identifiers of all of the host computers 200 that have been obtained in the process of Step 9020 and that provide the same services in Step 9110.

When it is judged in the process of Step 9110 that the processes of Steps 9050 to 9100 have not been executed to the identifiers of all of the host computers 200 that have been obtained in the process of Step 9020 and that provide the same service, the process returns to Step 9020.

On the other hand, when it is judged in the process of Step 9110 that the processes of Steps 9050 to 9100 have been executed to the identifiers of all of the host computers 200 that have been obtained in the process of Step 9020 and that provide the same service, it is judged whether the processes of Steps 9020 to 9110 have been executed to all entries obtained in the process of Step 9010 in Step 9120.

When it is judged in the process of Step 9120 that the processes of Steps 9020 to 9110 have not been executed to all entries obtained in the process of Step 9010, the process returns to Step 9010.

On the other hand, when it is judged in the process of Step 9120 that the processes of Steps 9020 to 9110 have been executed to all entries obtained in the process of Step 9010, the processes of the control computer management table creating program 9000 end in Step 9130.

When the command device is allocated to the host computer 200 that provides the same service as a certain computer 200 by the processes described above, the identifier of the storage area allocated to the certain computer 200 and the identifier of the host computer 200 that provides the same service as the certain computer 200 are registered in the control computer management table 2300. Accordingly, the host computer 200 to which the command device is allocated can control the storage area allocated to the other computer 200 that provides the same service as the host computer 200 via the command device.

Next, processes of updating the control computer management table 2300 when the configuration of the storage system 400 is changed will be explained with reference to FIGS. 15 through 20. To be specific, the storage management computer 300 changes the configuration specified by the administrator when the administrator instructs to change the configuration of the storage system 400 by using the storage management computer 300. The storage management computer 300 also updates the control computer management table 2300 stored in the storage system 400. Accordingly, along with the change of the configuration of the storage system 400, the host computer 200 that can control the storage area via the command device is changed.

Examples of changing of the configuration of the storage system 400 include a case of allocating the storage area to the host computer 200, a case of unallocating the storage area allocated to the host computer 200, a case of allocating the command device to the host computer 200, a case of unallocating the command device allocated to the host computer 200, a case of creating a pair of storage areas, a case of deleting the pair of storage areas, and the like.

Detail of the processes of updating the control computer management table 2300 in allocating the storage area to the host computer 200 will be explained with reference to FIG. 15. Detail of processes of updating the control computer management table 2300 in unallocating the storage area allocated to the host computer 200 will be explained with reference to FIG. 16. Detail of processes of updating the control computer management table 2300 in allocating the command device to the host computer 200 will be explained with reference to FIG. 17. Detail of processes of updating the control computer management table 2300 in unallocating the command device allocated to the host computer 200 will be explained with reference to FIG. 18. Detail of processes of updating the control computer management table 2300 in creating the pair of storage areas will be explained with reference to FIG. 19. Detail of processes of updating the control computer management table 2300 in deleting the pair of storage areas will be explained with reference to FIG. 20.

Figure 15:
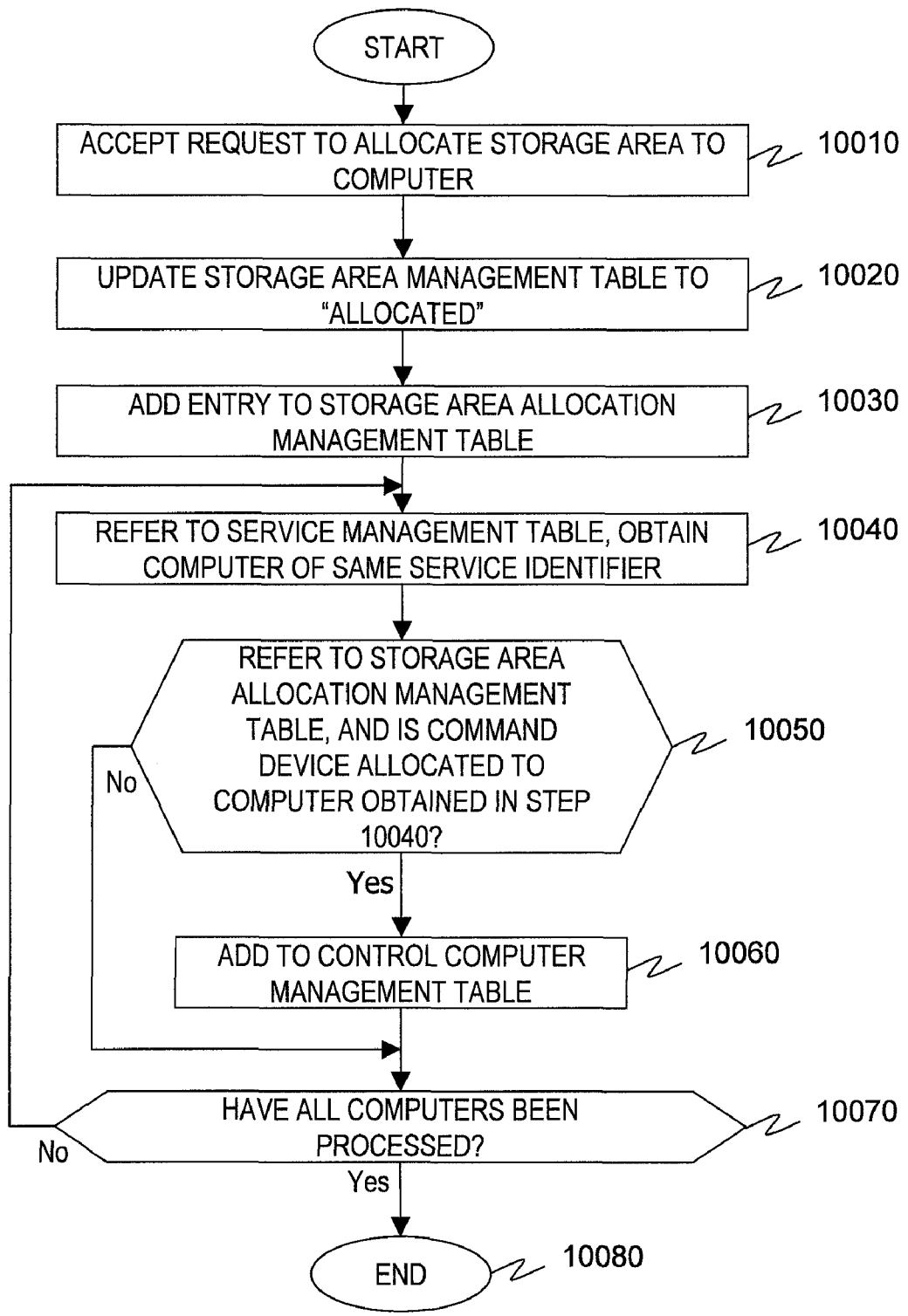
FIG. 15 is a flowchart of processes of a storage area allocating program according to the first embodiment of this invention.

FIG. 15 is a flowchart of processes of the storage area allocating program 10000 according to the first embodiment of this invention.

The storage area allocating program 10000 is loaded to the memory 306 provided in the storage management computer 300 and is executed by the processor unit.

First, the storage area allocating program 10000 receives a storage area allocation request inputted by the administrator in Step 10010. It should be noted that the storage area allocation request contains an identifier of the host computer 200 to which the storage area is newly allocated, an identifier of the storage system 400 in which the storage area to be newly allocated to the host computer 200 is set, and an identifier of the storage area to be newly allocated to the host computer 200.

Next, the storage area allocating program 10000 registers "Y" indicating that the storage area is allocated to the host computer 200 in the column of the "allocated" 20504 contained in the storage area management table 2050 corresponding to the storage area allocation request in Step 10020.

To be specific, the storage area allocating program 10000 registers "Y" in the column of the "allocated" 20504 of an entry in which an identifier registered in the storage area identifier 20502 coincides with the identifier of the storage area contained in the storage area allocation request among entries registered in the storage area management table 2050 stored in the storage system 400 identified by the identifier of the storage system 400 contained in the storage area allocation request.

Then, the storage area allocating program 10000 adds the new entry to the storage area allocation management table 2100 corresponding to the storage area allocation request in Step 10030.

To be specific, the storage area allocating program 10000 registers the identifier of the storage area contained in the storage area allocation request to the storage area identifier 21002 and the identifier of the host computer 200 contained in the storage area allocation request to the computer identifier 21003 as a new entry to the storage area management table 2050 stored in the storage system 400 identified by the identifier of the storage system 400 contained in the storage area allocation request. The storage area allocating program 10000 also registers "N" to the command device 21004 of the added entry.

Next, the storage area allocating program 10000 refers to the service management table 1100 to obtain an identifier of a computer 200 that provides the same service as the host computer 200 identified by the identifier of the host computer 200 contained in the storage area allocation request in Step 10040. It should be noted that the storage area allocating program 10000 obtains the service management table 1100 stored in the service management computer 500 and stores the service management table 1100 in the memory 306 in the case of referring to the service management table 1100.

To be specific, the storage area allocating program 10000 obtains the identifier of the service registered in the service identifier 11001 of an entry in which the identifier registered in the computer identifier 11002 coincides with the identifier of the host computer 200 contained in the storage area allocation request among the entries registered in the service management table 1100.

Then, the storage area allocating program 10000 obtains identifiers of all computers 200 registered in the computer identifier 11002 contained in the entry in which the identifier of the service registered in the service identifier 11001 coincides with the obtained identifier of the service among the entries registered in the service management table 1100.

It should be noted that the storage area allocating program 10000 selects an identifier of one computer 200 out of the obtained identifiers of all computers 200 that provide the same service in the process of Step 10040.

Next, the storage area allocating program 10000 refers to the storage area allocation management table 2100 to judge whether the command device is allocated to the host computer 200 identified by the identifier selected in the process of Step 10040 in Step 10050. It should be noted that the storage area allocating program 10000 obtains the storage area allocation management table 2100 stored in the storage system 400 and stores the storage area allocation management table 2100 in the memory 306 in the case of referring to the storage area allocation management table 2100.

To be specific, the storage area allocating program 10000 refers to the storage area allocation management table 2100 stored in the storage system 400 identified by the identifier of the storage system 400 contained in the storage area allocation request.

Then, the storage area allocating program 10000 judges whether "Y" is registered in the command device 21004 of the entry in which the identifier registered in the computer identifier 21003 coincides with the identifier of the host computer 200 contained in the storage area allocation request among entries registered in the storage area allocation management table 2100 to be referred to.

When it is judged in the process of Step 10050 that no command device is allocated to the host computer 200 identified by the identifier selected in the process of Step 10040, the storage area allocating program 10000 advances to the process of Step 10070.

On the other hand, when it is judged in the process of Step 10050 that the command device is allocated to the host computer 200 identified by the identifier selected in the process of Step 10040, the host computer 200 to which the command device is allocated and that provides the same service as the host computer 200 is permitted to control the storage area newly allocated to the host computer 200. Accordingly, the storage area allocating program 10000 registers the identifier of the storage area contained in the storage area allocation request and the identifier of the host computer 200 judged to have been allocated with the command device in the process of Step 10050 in the control computer management table 2300 in Step 10060, and advances to the process of Step 10070.

To be specific, the storage area allocating program 10000 registers the identifier of the storage area contained in the storage area allocation request to the control target storage area identifier 23002. Then, the storage area allocating program 10000 registers the identifier of the host computer 200 judged to have been allocated with the command device in the process of Step 10050 to the computer identifier 23003.

In other words, the identifier of the storage area allocated anew to the host computer 200 is registered in the control target storage area identifier 23002. The identifier of the host computer 200 that provides the same service as the host computer 200 to which the storage area is allocated anew, and to which the command device is allocated is registered in the computer identifier 23003.

Next, the storage area allocating program 10000 judges whether the processes of Steps 10050 to 10060 have been executed to the identifiers of all computers 200 that provide the same service and are obtained in the process of Step 10040 in Step 10070.

When it is judged in the process of Step 10070 that the processes of Steps 10050 to 10060 have not been executed to the identifiers of all computers 200 that provide the same service and are obtained in the process of Step 10040, the process returns to Step 10040.

When it is judged in the process of Step 10070 that the processes of Steps 10050 to 10060 have been executed to the identifiers of all computers 200 that provide the same service and are obtained in the process of Step 10040, the processes of the storage area allocating program 10000 end in Step 10080.

Figure 16:
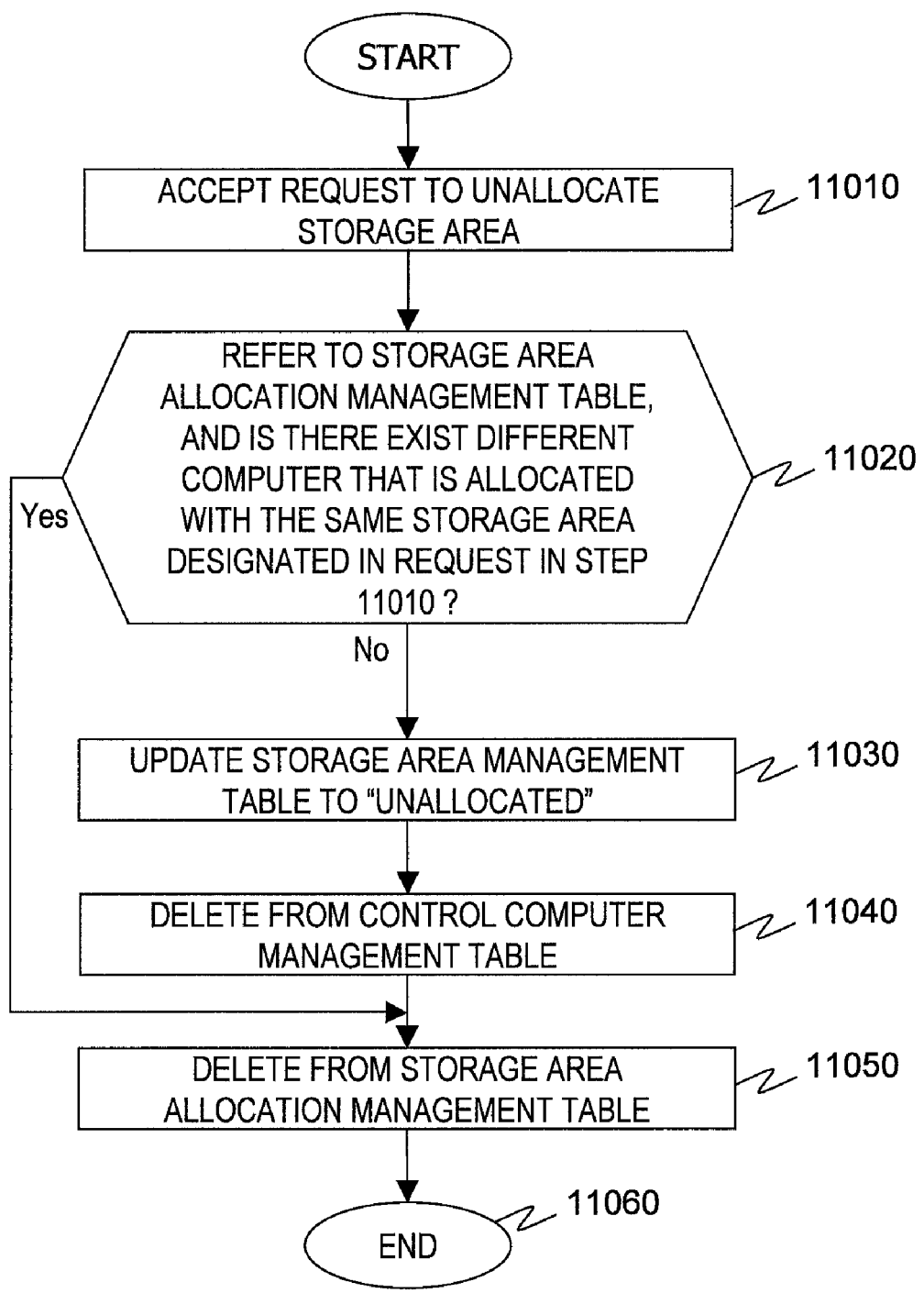
FIG. 16 is a flowchart of processes of a storage area unallocating program according to the first embodiment of this invention.

FIG. 16 is a flowchart of processes of the storage area unallocating program 11000 according to the first embodiment of this invention.

The storage area unallocating program 11000 is loaded to the memory 306 provided in the storage management computer 300 and is executed by the processor unit.

First, the storage area unallocating program 11000 accepts a storage area unallocation request inputted by the administrator in Step 11010. It should be noted that the storage area unallocation request contains an identifier of the host computer 200 whose relationship of allocation with the storage area is freed, an identifier of the storage system 400 in which the storage area whose relationship of allocation with the host computer 200 is freed, and an identifier of the storage area whose relationship of allocation with the host computer 200 is freed.

Next, the storage area unallocating program 11000 refers to the storage area allocation management table 2100 corresponding to the storage area unallocation request to judge whether another computer 200 is allocated with the storage area identified by the identifier of the storage area contained in the storage area unallocation request in Step 11020. It should be noted that the storage area unallocating program 11000 obtains the storage area allocation management table 2100 stored in the storage system 400, and stores the storage area allocation management table 2100 in the memory 306 in the case of referring to the storage area allocation management table 2100.

To be specific, the storage area unallocating program 11000 refers to the storage area allocation management table 2100 stored in the storage system 400 identified by the identifier of the storage system 400 contained in the storage area unallocation request.

Then, the storage area unallocating program 11000 judges whether an identifier other than the identifier of the host computer 200 contained in the storage area unallocation request is registered in the computer identifier 21003 of an entry coincident with the identifier of the storage area contained in the storage area unallocation request among entries registered in the storage area allocation management table 2100 to be referred to.

When it is judged in the process of Step 11020 that there exists the other computer 200 that is allocated with the storage area identified by the identifier of the storage area contained in the storage area unallocation request, there should exist computer 200 that is permitted to control the storage area whose relationship of allocation with the host computer 200 is freed. Accordingly, the storage area unallocating program 11000 advances to a process of Step 11050.

When it is judged in the process of Step 11020 that no other computer 200 is allocated with the storage area identified by the identifier of the storage area contained in the storage area unallocation request, the storage area unallocating program 11000 registers "N" indicating that the storage area is not allocated to the host computer 200 in the "allocated" 20504 contained in the storage area management table 2050 corresponding to the storage area unallocation request in Step 11030.

To be specific, the storage area unallocating program 11000 registers "N" to the "allocated" 20504 of the entry in which the identifier registered in the storage area identifier 20502 coincides with the identifier of the storage area contained in the storage area unallocation request among entries registered in the storage area management table 2050 stored in the storage system 400 identified by the identifier of the storage system 400 contained in the storage area unallocation request.

Next, the storage area unallocating program 11000 deletes the entry in which the identifier registered in the control target storage area identifier 23002 coincides with the identifier of the storage area contained in the storage area unallocation request among entries registered in the control computer management table 2300 in Step 11040.

Next, the storage area unallocating program 11000 deletes the entry corresponding to the storage area unallocation request from the storage area allocation management table 2100 corresponding to the storage area unallocation request in Step 11050, and ends the process of the storage area unallocating program 11000 in Step 11060.

To be specific, the storage area unallocating program 11000 deletes the entry in which the identifier registered in the computer identifier 23003 coincides with the identifier of the host computer 200 contained in the storage area unallocation request among the entries registered in the storage area allocation management table 2100 stored in the storage system 400 identified by the identifier of the storage system 400 contained in the storage area unallocation request.

Figure 17:
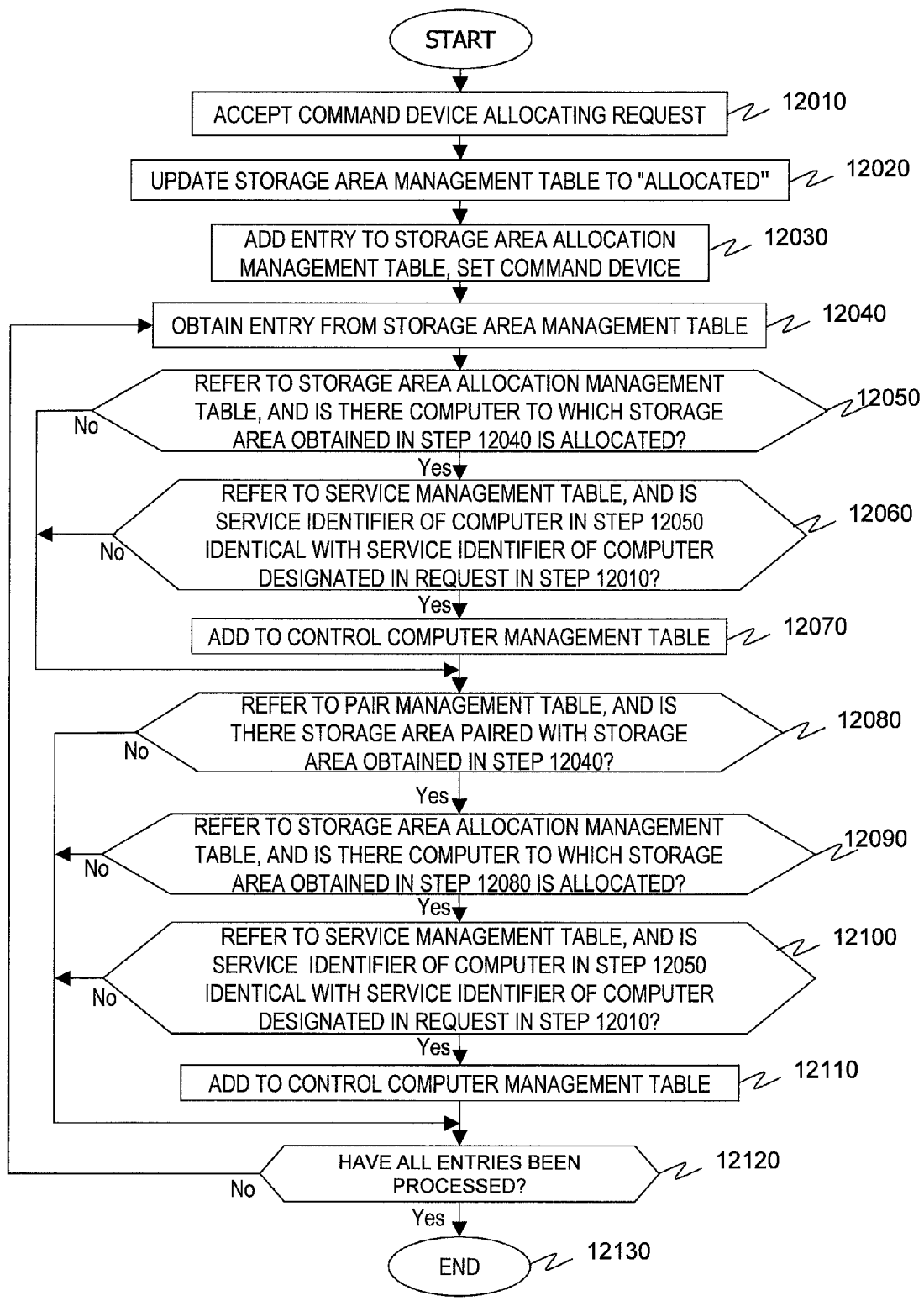
FIG. 17 is a flowchart of processes of a command device allocating program according to the first embodiment of this invention.

FIG. 17 is a flowchart of processes of the command device allocating program 12000 according to the first embodiment of this invention.

The command device allocating program 12000 is loaded to the memory 306 provided in the storage management computer 300 and is executed by the processor unit.

First, the command device allocating program 12000 receives a command device allocation request in Step 12010. It should be noted that the command device allocation request contains an identifier of the host computer 200 to which the command device is newly allocated, an identifier of the storage system 400 in which the storage area to be newly allocated as the command device to the host computer 200 is set, and an identifier of the storage area to be newly allocated as the command device to the host computer 200.

Next, the command device allocating program 12000 registers "Y" indicating that the storage area is allocated to the host computer 200 in the column of the "allocated" 20504 contained in the storage area management table 2050 corresponding to the command device allocation request in Step 12020.

To be specific, the command device allocating program 12000 registers "Y" in the column of the "allocated" 20504 of an entry in which an identifier registered in the storage area identifier 20502 coincides with the identifier of the storage area contained in the command device allocation request among entries registered in the storage area management table 2050 stored in the storage system 400 identified by the identifier of the storage system 400 contained in the command device allocation request.

Then, the command device allocating program 12000 adds the new entry to the storage area allocation management table 2100 corresponding to the command device allocation request in Step 12030.

To be specific, the command device allocating program 12000 registers the identifier of the storage area contained in the command device allocation request to the storage area identifier 21002 and the identifier of the host computer 200 contained in the command device allocation request to the computer identifier 21003 as a new entry to the storage area management table 2050 stored in the storage system 400 identified by the identifier of the storage system 400 contained in the command device allocation request. The command device allocating program 12000 also registers "Y" to the command device 21004 of the added entry. Accordingly, the storage area is allocated to the host computer 200 as the command device.

Next, the command device allocating program 12000 obtains all entries registered in the storage area management table 2050 stored in the storage system 400 identified by the identifier of the storage system 400 contained in the command device allocation request in Step 12040. It should be noted that instead of obtaining all entries contained in the storage area management table 2050, only identifiers of all storage areas registered in the storage area identifier 20502 contained in the storage area management table 2050 may be obtained.

Next, the command device allocating program 12000 refers to the storage area allocation management table 2100 stored in the storage system 400 identified by the identifier of the storage system 400 contained in the command device allocation request to judge whether the host computer 200 is allocated with the storage area identified by the identifier of the storage area contained in the entry obtained in the process of Step 12040 in Step 12050. It should be noted that the command device allocating program 12000 obtains the storage area allocation management table 2100 stored in the storage system 400 and stores the storage area allocation management table 2100 in the memory 306 in the case of referring to the storage area allocation management table 2100. To be specific, the command device allocating program 12000 judges whether the identifier is registered in the computer identifier 21003 of an entry in which the identifier registered in the storage area identifier 21002 coincides with the identifier of the storage area obtained in the process of Step 12040 among the entries registered in the storage area allocation management table 2100 to be referred to.

When it is judged in the process of Step 12050 that the host computer 200 is not allocated with the storage area identified by the identifier of the storage area contained in the entry obtained in the process of Step 12040, the command device allocating program 12000 advances to the process of Step 12080.

On the other hand, when it is judged in the process of Step 12050 that the host computer 200 is allocated with the storage area identified by the identifier of the storage area contained in the entry obtained in the process of Step 12040, the command device allocating program 12000 obtains the identifier of the host computer 200 that is allocated with the storage area and advances to the process of Step 12070.

Next, the command device allocating program 12000 refers to the service management table 1100 to judge whether the host computer 200 identified by the identifier of the host computer 200 obtained in the process of Step 12050 provides the same service with that of the host computer 200 identified by the identifier of the host computer 200 contained in the command device allocation request in Step 12060. It should be noted that the command device allocating program 12000 obtains the service management table 1100 stored in the service management computer 500 and stores the service management table 1100 in the memory 306 in the case of referring to the service management table 1100.

To be specific, the command device allocating program 12000 refers to the service management table 1100 to judge whether the identifier of the service registered in the service identifier 11001 of the entry coincident with the identifier of the host computer 200 obtained in the process of Step 12050 coincides with the identifier of the service registered in the service identifier 11001 of the entry coincident with the identifier of the host computer 200 contained in the command device allocation request.

When it is judged in the process of Step 12060 that none of the host computers 200 identified by the identifiers of the host computers 200 obtained in the process of Step 12050 provides the same service as the host computer 200 identified by the identifier of the host computer 200 contained in the command device allocation request, the command device allocating program 12000 advances to the process of Step 12080.

On the other hand, when it is judged in the process of Step 12060 that at least one of the host computers 200 identified by the identifiers of the host computers 200 obtained in the process of Step 12050 provides the same service as the host computer 200 identified by the identifier of the host computer 200 contained in the command device allocation request, the host computer 200 to which the command device is newly allocated is a computer 200 that is permitted to control the storage area allocated to the host computer 200 that provides the same service as computer 200. Accordingly, the command device allocating program 12000 obtains the identifier of the host computer 200 that provides the same service as the host computer 200 contained in the command device allocation request and advances to a process of Step 12070.

Next, the command device allocating program 12000 adds the identifier of the host computer 200 contained in the command device allocation request and the identifier of the storage area allocated to the host computer 200 judged to be the host computer 200 that provides the same service as the host computer 200 identified by the identifier of the host computer 200 contained in the command device allocation request in the process of Step 12060 to the control computer management table 2300 in Step 12070.

To be specific, the command device allocating program 12000 registers the identifier of the host computer 200 contained in the command device allocation request to the computer identifier 23003. Then, the command device allocating program 12000 registers the identifier of the storage area allocated to the host computer 200 judged to be the host computer 200 that provides the same service as the host computer 200 identified by the identifier of the host computer 200 contained in the command device allocation request in the process of Step 12060 to the control target storage area identifier 23002.

Next, the command device allocating program 12000 refers to the pair management table 2200 stored in the storage system 400 identified by the identifier of the storage system 400 contained in the command device allocation request to judge whether there exists a storage area composing a pair with the storage area identified by the identifier of the storage area obtained in the process of Step 12040 in Step 12080. It should be noted that the command device allocating program 12000 obtains the pair management table 2200 stored in the storage system 400 and stores the pair management table 2200 in the memory 306 in the case of referring to the pair management table 2200.

When it is judged in the process of Step 12080 that the storage area composing the pair with the storage area identified by the identifier of the storage area obtained in the process of Step 12040 does not exist, the command device allocating program 12000 advances to a process of Step 12120.

When it is judged in the process of Step 12080 that there exists the storage area composing the pair with the storage area identified by the identifier of the storage area obtained in the process of Step 12040, the command device allocating program 12000 obtains the identifier of the storage area composing the pair with the storage area identified by the identifier of the storage area contained in the command device allocation request and advances to a process of Step 12090.

The command device allocating program 12000 refers to the storage area allocation management table 2100 stored in the storage system 400 identified by the identifier of the storage system 400 contained in the command device allocation request to judge whether the host computer 200 is allocated with the storage area identified by the identifier of the storage area obtained in the process of Step 12080 in Step 12090. It should be noted that the command device allocating program 12000 obtains the storage area allocation management table 2100 stored in the storage system 400 and stores the storage area allocation management table 2100 in the memory 306 in the case of referring to the storage area allocation management table 2100.

To be specific, the command device allocating program 12000 judges whether the identifier is registered in the computer identifier 21003 of the entry in which the identifier registered in the storage area identifier 21002 coincides with the identifier of the storage area obtained in the process of Step 12080 among entries registered in the storage area allocation management table 2100 to be referred to.

When it is judged in the process of Step 12090 that the host computer 200 is not allocated with the storage area identified by the identifier of the storage area contained in the entry obtained in the process of Step 12080, the command device allocating program 12000 advances to a process of Step 12120.

When it is judged in the process of Step 12090 that the host computer 200 is allocated with the storage area identified by the identifier of the storage area contained in the entry obtained in the process of Step 12080, the command device allocating program 12000 obtains the identifier of the host computer 200 allocated with that storage area and advances to the process of Step 12070.

Next, the command device allocating program 12000 refers to the service management table 1100 to judge whether the host computer 200 identified by the identifier of the host computer 200 obtained in the process of Step 12090 provides the same service as the host computer 200 identified by the identifier of the host computer 200 contained in the command device allocation request in Step 12100. It should be noted that the command device allocating program 12000 obtains the service management table 1100 stored in the service management computer 500 and stores the service management table 1100 in the memory 306 in the case of referring to the service management table 1100.

To be specific, the command device allocating program 12000 refers to the service management table 1100 to judge whether the identifier of the service registered in the service identifier 11001 of the entry coincident with the identifier of the host computer 200 obtained in the process of Step 12090 coincides with the identifier of the service registered in the service identifier 11001 of the entry coincident with the identifier of the host computer 200 contained in the command device allocation request.

When it is judged in the process of Step 12100 that none of the host computers 200 identified by the identifier of the host computer 200 obtained in the process of Step 12090 provides the same service as the host computer 200 identified by the identifier of the host computer 200 contained in the command device allocation request, the command device allocating program 12000 advances to a process of Step 12120.

On the other hand, when it is judged in the process of Step 12100 that at least one of the host computers 200 identified by the identifiers of the host computers 200 obtained in the process of Step 12090 provides the same service as the host computer 200 identified by the identifier of the host computer 200 contained in the command device allocation request, it is the host computer 200 that is permitted to control the storage area composing the pair with the storage area set in the storage system 400 in which the command device newly allocated is set. Accordingly, the command device allocating program 12000 obtains the identifier of the host computer 200 that provides the same service as the host computer 200 contained in the command device allocation request and advances to a process of Step 12110.

Next, the command device allocating program 12000 adds the identifier of the storage area contained in the command device allocation request and the identifier of the storage area allocated to the host computer 200 judged to be the host computer 200 that provides the same service as the host computer 200 identified by the identifier of the host computer 200 contained in the command device allocation request in the process of Step 12100 to the control computer management table 2300 in Step 12110.

To be specific, the command device allocating program 12000 registers the identifier of the storage area contained in the command device allocation request to the computer identifier 23003. Then, the command device allocating program 12000 registers the identifier of the storage area allocated to the host computer 200 judged to be the host computer 200 that provides the same service as the host computer 200 identified by the identifier of the host computer 200 contained in the command device allocation request in the process of Step 12100 to the control target storage area identifier 23002.

Next, the command device allocating program 12000 judges whether the processes of Steps 12050 to 12110 have been executed to all entries obtained in the process of Step 12040 in Step 12120.

When it is judged in the process of Step 12120 that the processes of Steps 12050 to 12110 have not been executed to all entries obtained in the process of Step 12040, the process returns to Step 12040.

When it is judged in the process of Step 12120 that the processes of Steps 12050 to 12110 have not been executed to all entries obtained in the process of Step 12040, the processes of the command device allocating program 12000 end in Step 12130.

Figure 18:
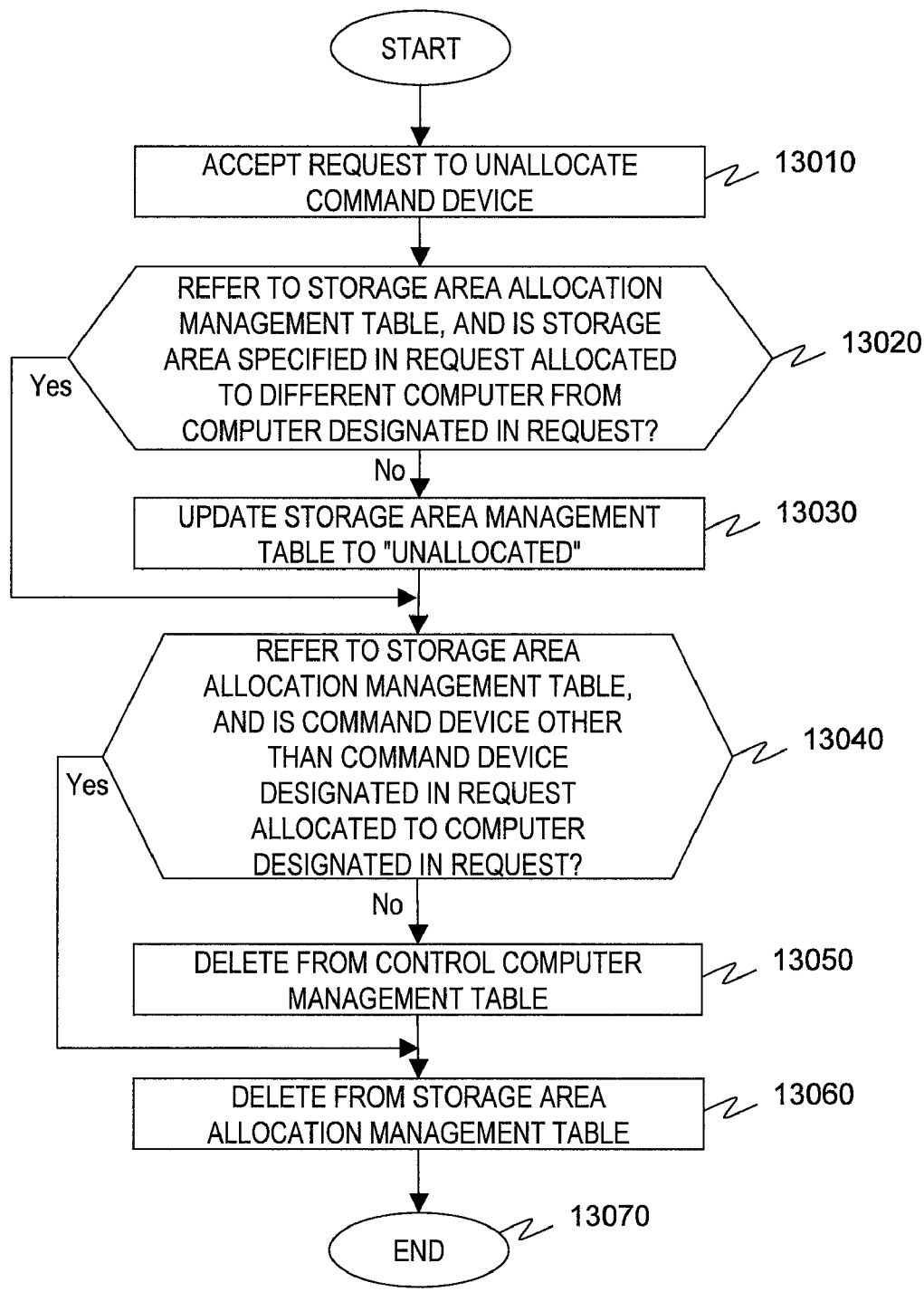
FIG. 18 is a flowchart of processes of a command device unallocating program according to the first embodiment of this invention.

FIG. 18 is a flowchart of processes of the command device unallocating program 13000 according to the first embodiment of this invention.

The command device unallocating program 13000 is loaded to the memory 306 provided in the storage management computer 300 and is executed by the processor unit.

First, the command device unallocating program 13000 accepts a command device unallocation request inputted by the administrator in Step 13010. It should be noted that the command device unallocation request contains an identifier of the host computer 200 whose relationship of allocation with the command device is freed, an identifier of the storage system 400 in which the storage area, i.e., the command device whose relationship of allocation with the host computer 200, is freed, and an identifier of the storage area, i.e., the command device, whose relationship of allocation with the host computer 200 is freed.

Next, the command device unallocating program 13000 refers to the storage area allocation management table 2100 corresponding to the command device unallocation request to judge whether another computer 200 is allocated to the storage area identified by the identifier of the storage area contained in the command device unallocation request in Step 13020. It should be noted that the command device unallocating program 13000 obtains the storage area allocation management table 2100 stored in the storage system 400 and stores the storage area allocation management table 2100 in the memory 306 in the case of referring to the storage area allocation management table 2100.

To be specific, the command device unallocating program 13000 refers to the storage area allocation management table 2100 stored in the storage system 400 identified by the identifier of the storage system 400 contained in the command device unallocation request.

Then, the command device unallocating program 13000 judges whether an identifier other than the identifier of the host computer 200 contained in the command device unallocation request is registered in the computer identifier 21003 of an entry coincident with the identifier of the storage area contained in the command device unallocation request among entries registered in the storage area allocation management table 2100 to be referred.

When it is judged in the process of Step 13020 that the other computer 200 is allocated to the storage area identified by the identifier of the storage area contained in the command device unallocation request, the command device unallocating program 13000 advances to a process of Step 13040.

When it is judged in the process of Step 13020 that no other computer 200 is allocated to the storage area identified by the identifier of the storage area contained in the command device unallocation request, the command device whose relationship of allocation with the host computer 200 is to be freed is not allocated to any computer 200. Accordingly, the command device unallocating program 13000 registers "N" indicating that the storage area is not allocated to the host computer 200 in the "allocated" 20504 contained in the storage area management table 2050 corresponding to the command device unallocation request in Step 13030.

To be specific, the command device unallocating program 13000 registers "N" to the "allocated" 20504 of the entry in which the identifier registered in the storage area identifier 20502 coincides with the identifier of the storage area contained in the command device unallocation request among entries registered in the storage area management table 2050 stored in the storage system 400 identified by the identifier of the storage system 400 contained in the command device unallocation request.

Then, the command device unallocating program 13000 refers to the storage area allocation management table 2100 corresponding to the command device unallocation request to judge whether a command device other than that identified by the identifier of the storage area contained in the command device unallocation request is allocated to the host computer 200 identified by the identifier of the host computer 200 contained in the command device unallocation request in Step 13040.

When it is judged in the process of Step 13040 that the command device other than the command device identified by the identifier of the storage area contained in the command device unallocation request is allocated to the host computer 200 identified by the identifier of the host computer 200 contained in the command device unallocation request, the command device unallocating program 13000 advances to a process of Step 13060.

When it is judged in the process of Step 13040 that no command device other than the command device identified by the identifier of the storage area contained in the command device unallocation request is allocated to the host computer 200 identified by the identifier of the host computer 200 contained in the command device unallocation request, the host computer 200 whose relationship of allocation with the command device is to be freed is not allocated to any command device. Therefore, the host computer 200 should not be permitted to control any storage area. Accordingly, the command device unallocating program 12000 advances to the process of Step 13050.

Next, the command device unallocating program 13000 deletes the entry in which the identifier registered in the computer identifier 23003 coincides with the identifier of the computer contained in the command device unallocation request among entries registered in the control computer management table 2300 in Step 13040.

Next, the command device unallocating program 13000 deletes the entry corresponding to the command device unallocation request out of the storage area allocation management table 2100 corresponding to the command device unallocation request in Step 13060 and ends the processes of the command device unallocating program 13000 in Step 13070.

To be specific, the command device unallocating program 13000 deletes the entry in which the identifier registered in the computer identifier 23003 coincides with the identifier of the host computer 200 contained in the command device unallocation request among the entries registered in the storage area allocation management table 2100 stored in the storage system 400 identified by the identifier of the storage system 400 contained in the command device unallocation request.

Figure 19:
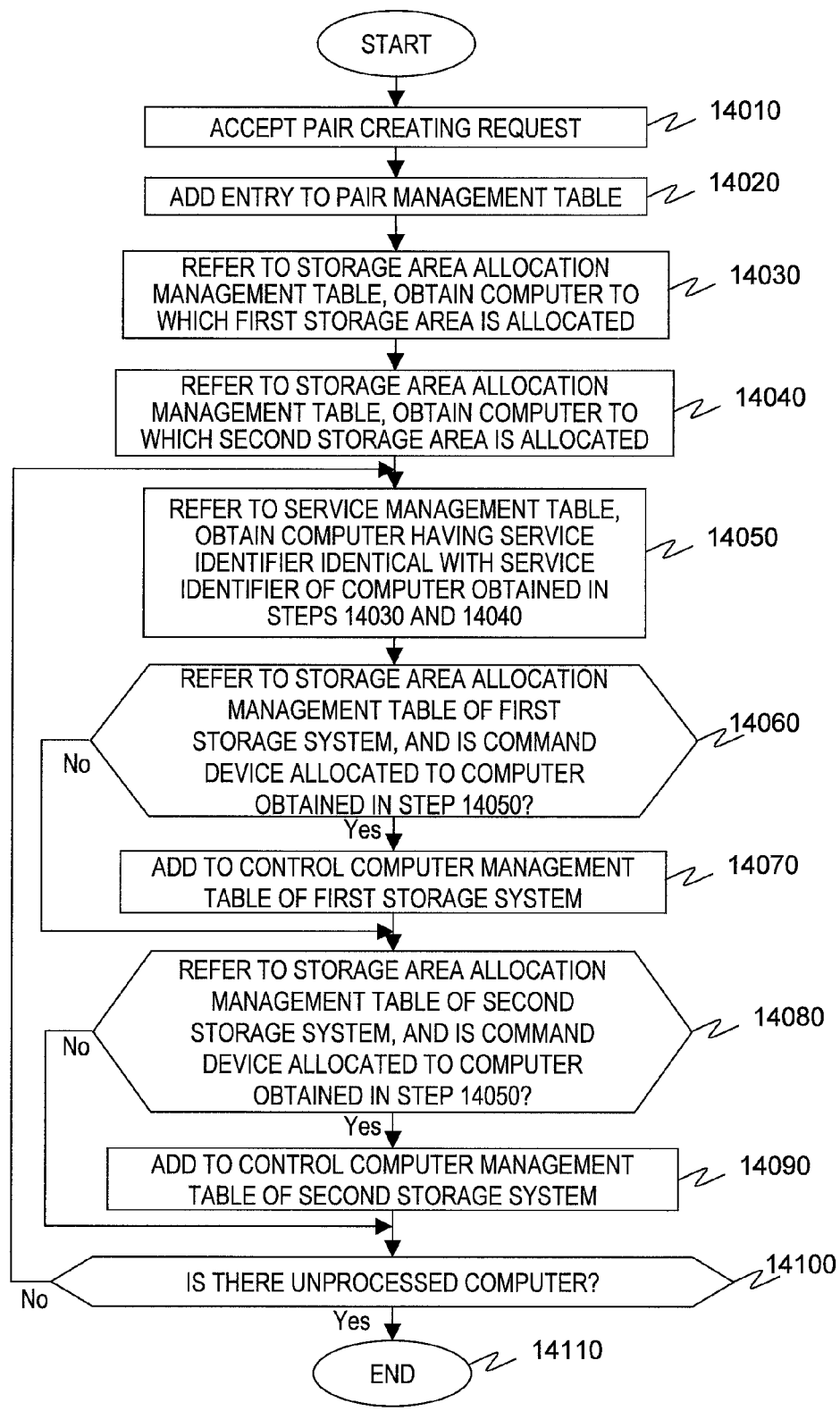
FIG. 19 is a flowchart of processes of a pair creating program according to the first embodiment of this invention.

FIG. 19 is a flowchart of processes of the pair creating program 14000 according to the first embodiment of this invention.

The pair creating program 14000 is loaded to the memory 306 provided in the storage management computer 300 and is executed by the processor unit.

First, the pair creating program 14000 receives a pair creating request inputted by the administrator in Step 14010. It should be noted that the pair creating request contains an identifier of a first storage system 400 in which a first storage area that composes a pair is set, an identifier of the first storage area composing the pair, an identifier of a second storage system 400 in which a second storage area that composes the pair is set, and an identifier of the second storage area composing the pair.

Then, the pair creating program 14000 adds a new entry to the pair management table 2200 stored in the first storage system 400 identified by the identifier of the first storage system 400 contained in the pair creating request in Step 14020. It should be noted that the pair creating program 14000 also adds a new entry to the pair management table 2200 stored in the second storage system 400 identified by the identifier of the second storage system 400 contained in the pair creating request.

To be specific, the pair creating program 14000 registers the identifier of the first storage system 400 contained in the pair creating request to the first storage system identifier 22001 of the pair management table 2200 stored in the first storage system 400. The pair creating program 14000 registers the identifier of the first storage area contained in the pair creating request to a first storage area identifier 22002.

The pair creating program 14000 registers an identifier of the second storage system 400 contained in the pair creating request to a second storage system identifier 22003. Then, the pair creating program 14000 registers an identifier of the second storage area contained in the pair creating request to the second storage area identifier 22004.

Next, the pair creating program 14000 refers to the storage area allocation management table 2100 stored in the first storage system 400 identified by the identifier of the first storage system 400 contained in the pair creating request to obtain an identifier of the host computer 200 to which the first storage area identified by the identifier of the first storage area contained in the pair creating request is allocated in Step 14030. It should be noted that the pair creating program 14000 obtains the storage area allocation management table 2100 stored in the first storage system 400 and stores the storage area allocation management table 2100 to the memory 306 in the case of referring to the storage area allocation management table 2100 stored in the first storage system 400.

To be specific, the pair creating program 14000 obtains the identifier registered in the computer identifier 21003 of an entry in which the identifier registered in the storage area identifier 21002 coincides with the identifier of the first storage area contained in the pair creating request among entries registered in the storage area allocation management table 2100 to be referred.

Next, the pair creating program 14000 refers to the storage area allocation management table 2100 stored in the second storage system 400 identified by the identifier of the second storage system 400 contained in the pair creating request to obtain an identifier of a computer 200 to which the second storage area identified by the identifier of the second area contained in the pair creating request is allocated in Step 14040. It should be noted that the pair creating program 14000 obtains the storage area allocation management table 2100 stored in the second storage system 400 and stores the storage area allocation management table 2100 in the memory 306 in the case of referring to the storage area allocation management table 2100 stored in the second storage system 400.

To be specific, the pair creating program 14000 obtains the identifier registered in the computer identifier 21003 of the entry in which the identifier registered in the storage area identifier 21002 coincides with the identifier of the second storage area contained in the pair creating request among the entries registered in the storage area allocation management table 2100 to be referred.

Next, the pair creating program 14000 refers to the service management table 1100 to obtain an identifier of the host computer 200 that provides the same service with that of the host computer 200 identified by the identifier of the host computer 200 obtained in the process of Step 14030, in Step 14050. It should be noted that the pair creating program 14000 obtains the service management table 1100 stored in the service management computer 500 and stores the service management table 1100 to the memory 306 in the case of referring to the service management table 1100.

The pair creating program 14000 also refers to the service management table 1100 in the process of Step 14050 to obtain the identifier of the host computer 200 that provides the same service with that of the host computer 200 identified by the identifier of the host computer 200 obtained in the process of Step 14040.

To be specific, the pair creating program 14000 obtains the identifier of the service registered in the service identifier 11001 of the entry in which the identifier registered in the computer identifier 11002 coincides with the identifier of the host computer 200 obtained in the process of Step 14030 among the entries registered in the service management table 1100.

Then, the pair creating program 14000 obtains identifiers of all computers 200 registered in the computer identifier 11002 contained in the entry in which the identifier of the service registered in the service identifier 11001 coincides with the obtained identifier of service among the entries registered in the service management table 1100.

It should be noted that the pair creating program 14000 selects an identifier of one computer 200 out of the obtained identifiers of all computers 200 that provide the same service.

Next, the pair creating program 14000 refers to the storage area allocation management table 2100 stored in the first storage system 400 to judge whether the command device is allocated to the host computer 200 identified by the identifier selected in the process of Step 14050, in Step 14060.

To be specific, the pair creating program 14000 judges whether "Y" is registered in the command device 21004 of the entry in which the identifier registered in the computer identifier 21003 coincides with the identifier of the host computer 200 obtained in the process of Step 14050 among entries registered in the storage area allocation management table 2100 stored in the first storage system 400.

When it is judged in the process of Step 14060 that no command device is allocated to the host computer 200 identified by the identifier selected in the process of Step 14050, the pair creating program 14000 advances to the process of Step 14080.

When it is judged in the process of Step 14060 that the command device is allocated to the host computer 200 identified by the identifier selected in the process of Step 14050 on the other hand, the host computer 200 that provides the same service with the host computer 200 allocated in the first storage area and to which the command device is allocated is permitted to control the first storage area. Accordingly, the pair creating program 14000 registers the identifier of the first storage area contained in the pair creating request and the identifier of the host computer 200 judged to have been allocated with the command device in the process of Step 14060 in the control computer management table 2300 in Step 14070 and advances to the process of Step 14080.

To be specific, the pair creating program 14000 registers the identifier of the first storage area to the control target storage area identifier 23002. Then, the pair creating program 14000 registers the identifier of the host computer 200 judged to have been allocated with the command device in the process of Step 14050 to the computer identifier 23003.

Next, the pair creating program 14000 refers to the storage area allocation management table 2100 stored in the second storage system 400 to judge whether the command device is allocated to the host computer 200 identified by the identifier selected in the process of Step 14050, in Step 14080. It should be noted that the concrete process is the same as the process of Step 14060, so the explanation will be omitted here.

When it is judged in the process of Step 14080 that the command device is not allocated to the host computer 200 identified by the identifier selected in the process of Step 14050, the pair creating program 14000 advances to a process of Step 14100.

When it is judged in the process of Step 14080 that the command device is allocated to the host computer 200 identified by the identifier selected in the process of Step 14050 on the other hand, the host computer 200 that provides the same service with that of the host computer 200 allocated to the second storage area and to which the command device is allocated is permitted to control the second storage area. Accordingly, the pair creating program 14000 registers the identifier of the second storage area contained in the pair creating request and the identifier of the host computer 200 judged to have been allocated with the command device in the process of Step 14060 to the control computer management table 2300 in Step 14090 and advances to a process of Step 13100. It should be noted that the concrete process is the same as the process of Step 14070, so its explanation will be omitted here.

In other words, the identifier of the storage area that composes the newly created pair is registered in the control target storage area identifier 23002. Further, the identifier of the host computer 200 that provides the same service with that of the host computer 200 to which the storage area that composes the newly created pair is allocated and to which the command device is allocated is registered in the computer identifier 23003.

Next, the pair creating program 14000 judges whether the processes of Steps 10060 to 10090 have been executed to the identifiers of all computers 200 that provide the same service and are obtained in the process of Step 14050, in Step 14100.

When it is judged in the process of Step 14100 that the processes of Steps 14060 to 14090 have not been executed to the identifiers of all computers 200 that provide the same service and are obtained in the process of Step 14050, the process returns to Step 14050.

When it is judged in the process of Step 14100 that the processes of Steps 10060 to 14090 have been executed to the identifiers of all computers 200 that provide the same service and are obtained in the process of Step 14050, the processes of the pair creating program 14000 end in Step 14110.

Figure 20:
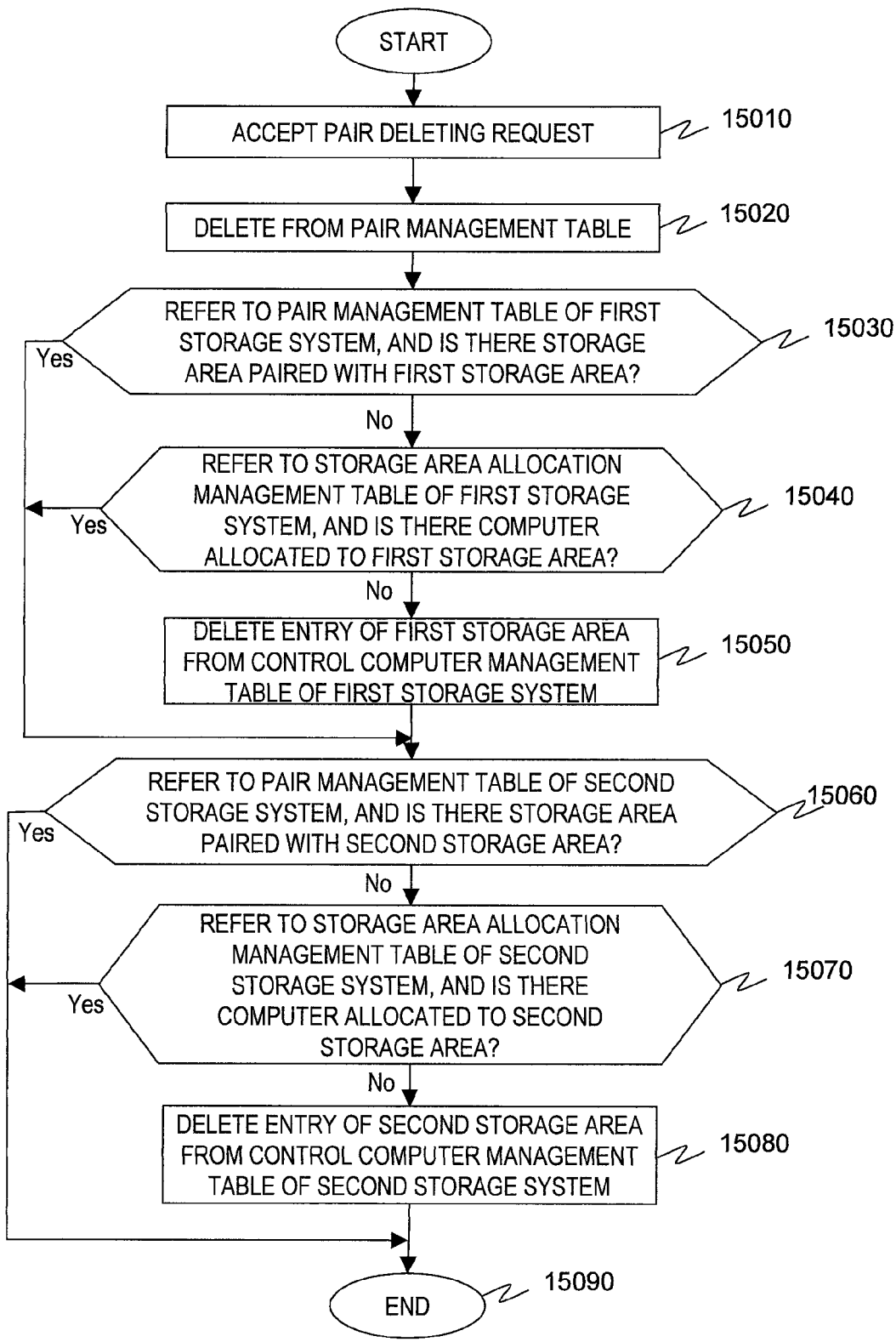
FIG. 20 is a flowchart of processes of a pair deleting program according to the first embodiment of this invention.

FIG. 20 is a flowchart of processes of the pair deleting program 15000 according to the first embodiment of this invention.

The pair deleting program 15000 is loaded to the memory 306 provided in the storage management computer 300 and is executed by the processor unit.

First, the pair deleting program 15000 receives a pair freeing request inputted by the administrator in Step 15010. It should be noted that the pair freeing request contains an identifier of the first storage system 400 in which a first storage area that composes a pair to be deleted is set, an identifier of the first storage area composing the pair to be deleted, an identifier of a second storage system 400 in which a second storage area that composes the pair is set, and an identifier of the second storage area composing the pair to be deleted.

Then, the pair deleting program 15000 adds a new entry to the pair management table 2200 stored in the first storage system 400 identified by the identifier of the first storage system 400 contained in the pair freeing request in Step 15020. It should be noted that the pair deleting program 15000 also deletes an entry to the pair management table 2200 stored in the second storage system 400 identified by the identifier of the second storage system 400 contained in the pair freeing request.

To be specific, the pair deleting program 15000 deletes entries in which the identifier registered in the first storage system identifier 22001, the identifier registered in the first storage area identifier 22002, the identifier registered in the second storage system identifier 22003, and the identifier registered in the second storage area identifier coincide with the identifier in the first storage system 400 contained in the pair freeing request, the identifier of the first storage area, the identifier in the second storage system 400, and the identifier in the second storage area among the entries registered in the pair management table 2200 stored in the first storage system 400.

Next, the pair deleting program 15000 refers to the pair management table 2200 stored in the first storage system 400 identified by the identifier of the first storage system 400 contained in the pair freeing request. Then, the pair deleting program 15000 judges whether a storage area other than the second storage area that composes the pair with the first storage area specified by the pair freeing request and that is specified by the pair freeing request exists in Step 15030. It should be noted that the pair deleting program 15000 obtains the pair management table 2200 stored in the first storage system 400 and stores the pair management table 2200 in the memory 306 in the case of referring to the pair management table 2200 stored in the first storage system 400.

When it is judged in the process of Step 15030 that there exists a storage area other than the second storage area that composes the pair with the first storage area specified by the pair freeing request and that is specified by the pair freeing request, the process advances to Step 15060.

When it is judged in the process of Step 15030 that there exists no storage area other than the second storage area that composes the pair with the first storage area specified by the pair freeing request and that is specified by the pair freeing request, the pair deleting program 15000 refers to the storage area allocation management table 2100 stored in the first storage system 400 identified by the identifier of the first storage system 400 contained in the pair freeing request. Then, the pair deleting program 15000 judges whether there exists a computer 200 allocated to the first storage area specified in the pair freeing request in Step 15040. It should be noted that the pair deleting program 15000 obtains the storage area allocation management table 2100 stored in the first storage system 400 and stores the storage area allocation management table 2100 to the memory 306 in the case of referring to the storage area allocation management table 2100 stored in the first storage system 400.

To be specific, the pair deleting program 15000 judges whether the identifier of the host computer 200 is registered in the computer identifier 21003 of an entry in which the identifier registered in the storage area identifier 21002 coincides with the identifier of the first storage area contained in the pair freeing request among entries registered in the storage area allocation management table 2100 to be referred.

When it is judged in the process of Step 15040 that there exists the host computer 200 allocated to the first storage area specified by the pair freeing request, the process advances to a process of Step 15060.

When it is judged in the process of Step 15040 that there exists no computer 200 allocated to the first storage area specified by the pair freeing request, there exists no computer 200 allocated to the first storage area. In other words, there exists no computer 200 that should be permitted to control the first storage area. Accordingly, the pair deleting program 15000 deletes the entry in which the identifier registered in the control target storage area identifier 23002 coincides with the first storage area contained in the pair freeing request among the entries registered in the control computer management table 2300 stored in the first storage system 400 identified by the identifier of the first storage system 400 contained in the pair freeing request in Step 15050.

Next, the pair deleting program 15000 refers to the pair management table 2200 stored in the second storage system 400 identified by the identifier of the second storage system 400 contained in the pair freeing request. Then, the pair deleting program 15000 judges whether a storage area other than the first storage area that composes the pair with the second storage area specified by the pair freeing request and that is specified by the pair freeing request exists in Step 15060. It should be noted that the pair deleting program 15000 obtains the pair management table 2200 stored in the second storage system 400 and stores the pair management table 2200 in the memory 306 in the case of referring to the pair management table 2200 stored in the second storage system 400.

When it is judged in the process of Step 15060 that there exists a storage area other than the first storage area that composes the pair with the second storage area specified by the pair freeing request and that is specified by the pair freeing request, the process of the pair deleting program 15000 ends in Step 15090.

When it is judged in the process of Step 15060 that there exists no storage area other than the first storage area that composes the pair with the second storage area specified by the pair freeing request and that is specified by the pair freeing request, the pair deleting program 15000 refers to the storage area allocation management table 2100 stored in the second storage system 400 identified by the identifier of the second storage system 400 contained in the pair freeing request. Then, the pair deleting program 15000 judges whether there exists a computer 200 allocated to the second storage area specified in the pair freeing request in Step 15070. It should be noted that the pair deleting program 15000 obtains the storage area allocation management table 2100 stored in the second storage system 400 and stores the storage area allocation management table 2100 to the memory 306 in the case of referring to the storage area allocation management table 2100 stored in the second storage system 400.

To be specific, the pair deleting program 15000 judges whether the identifier of the host computer 200 is registered in the computer identifier 21003 of an entry in which the identifier registered in the storage area identifier 21002 coincides with the identifier of the second storage area contained in the pair freeing request among entries registered in the storage area allocation management table 2100 to be referred.

When it is judged in the process of Step 15070 that there exists the host computer 200 allocated to the second storage area specified by the pair freeing request, the pair deleting program 15000 ends in Step 15090.

When it is judged in the process of Step 15070 that there exists no computer 200 allocated to the second storage area specified by the pair freeing request, there exists no computer 200 allocated to the second storage area. In other words, there exists no computer 200 that should be permitted to control the second storage area. Accordingly, the pair deleting program 15000 deletes the entry in which the identifier registered in the control target storage area identifier 23002 coincides with the second storage area contained in the pair freeing request among the entries registered in the control computer management table 2300 stored in the second storage system 400 identified by the identifier of the second storage system 400 contained in the pair freeing request in Step 15080 and ends in Step 15090.

According to this invention, when the host computer 200 that provides a service, the administrator allocates a storage area set in the storage system 400 to the host computer 200 to be added by using the storage management computer 300. Accordingly, computers permitted to control the storage area allocated to the added host computer 200 is limited to host computers 200 that provide the same service with the added host computer 200. When the host computer is to be deleted from the service, the administrator also frees the relationship of allocation between the host computer 200 to be deleted and the storage area allocated to the host computer 200 to be deleted by using the storage management computer 300. Accordingly, computers, permitted to control the storage area, become unable to control the storage area allocated to the host computer 200 to be deleted.

In other words, the control computer management table 2300 stored in the storage system 400 is updated when the configuration is changed through the use of the storage management computer 300. Accordingly, it becomes unnecessary for the administrator to manage the computers permitted to control the storage area besides changing the configuration. Accordingly, it becomes easy for the administrator to change the host computers 200 that compose the service.

The host computer 200 of this embodiment may be a blade server. When there is a plurality of blade servers within one case, one blade server corresponds to one computer 200.

The host computer 200 of this embodiment may be a virtual computer realized by software on a physical computer. When there is a plurality of virtual computers on one physical computer, one virtual computer corresponds to one host computer 200.

The two management computers of the service management computer 500 and the storage management computer 300 exist in this embodiment, but there may be one management computer. In this case, one management computer stores tables stored in the service management computer 500 and the storage management computer 300 and executes processes that are to be executed by the service management computer 500 and the storage management computer 300.

Second Embodiment

A second embodiment of this invention will be explained by using FIGS. 21 and 22.

According to the second embodiment of this invention, an operation permitted to a storage area set in the storage system 400 of the host computer 200 is decided based on a role of the host computer 200 defined in accordance to a role-of-computer 11003 contained in the service management table 1100.

An access control table 2400 is stored in the control memory 440 provided in the storage system 400, instead of the control computer management table 2300 of the first embodiment.

The access control table 2400 is also referred instead of the control computer management table 2300 in the step of referring to the control computer management table 2300 in the data input/output program 8000.

A computer role management table 3300 is also stored in the memory 306 provided in the storage management computer 300. Further, instead of the process of newly adding an entry to the control computer management table 2300 in the processes of the control computer management table creating program 9000, the storage area allocating program 10000, the command device allocating program 12000, and the pair creating program 14000 executed by the storage management computer 300, the entry is newly added to the access control table 2400.

Further, instead of process of deleting a certain entry out of entries contained in the control computer management table 2300 in the processes of the storage area unallocating program 11000, the command device unallocating program 13000, and the pair deleting program 15000 executed by the storage management computer 300, the certain entry is deleted out of the entries contained in the access control table 2400.

FIG. 21 is a table showing a configuration of the computer role management table 3300 according to the second embodiment of this invention.

The computer role management table 3300 contains a role-of-computer 33001 and a permitted operation 33002.

Information indicating a role of a computer 200 is registered in the role-of-computer 33001. Information indicating permitted operations to a storage area of the host computer 200 is registered in the permitted operation 33002.

The computer role management table 3300 shown in FIG. 21 shows that pair operation is permitted as for the permitted operations to the storage area of the host computer 200 that plays roles of backup and database and change of attribute is permitted as for the permitted operations to the storage area of the host computer 200 that plays a role of archive.

To be specific, as for the host computer 200 that plays the role of backup, the pair operation is permitted to change the status of the pair status from "Sync" to "Split" and to backup snapshot data stored in the storage area.

The host computer 200 that plays the role of database has a function to quiesce the database to execute coordinated backup of each data stored in the storage areas composing a pair. Then, in the host computer 200 that plays the role of database, the pair operation is permitted to change the pair status to "Split" at the timing when the database is quiesced.

In the host computer 200 that plays the role of archive, the change of attribute to the storage area is permitted to change archived data to read-only data.

FIG. 22 is a table showing a configuration of the access control table 2400 according to the second embodiment of this invention.

The access control table 2400 contains columns of a storage system identifier 24001, a control target storage area identifier 24002, a computer identifier 24003, and a permitted operation 24004.

It should be noted that the functions of the storage system identifier 24001, the control target storage area identifier 24002, and the computer identifier 24003 are the same as those in the control computer management table 2300 shown in FIG. 9, so the explanation will be omitted here.

Information indicating permitted operations to the storage area of the host computer 200 is registered in the permitted operation 24004.

When an entry is added to the access control table 2400, the service management table 1100 is referred. Then, the information registered in the role-of-computer 11003 contained in the service management table 1100 is obtained. Then, the role-of-computer management table 3300 is referred and information registered in the permitted operation 33002 of an entry in which information registered in the role-of-computer 33001 coincides with the obtained information registered in the role-of-computer 11003. Then, the obtained information registered in the permitted operation 33002 is registered in the permitted operation 24004 contained in the access control table 2400.

For example, database is registered in the role-of-computer 11003 of the server 2 in the service management table 1100 shown in FIG. 5. Pair operation is registered in the role-of-computer management table 3300 corresponding to the database in the role-of-computer management table 3300 shown in FIG. 21. Accordingly, pair operation is registered in the permitted operation 24004 of the entry when the computer identifier 24003 of the access control table 2400 shown in FIG. 22 is the server 2.

In the processes of the data input/output program 8000 executed by the storage system 400 of the second embodiment of this invention, the data input/output program 8000 judges whether information registered in the permitted operation 24004 contained in the access control table 2400 coincides with operation contained in a storage area control request in a process of Step 8070. When it is judged that the information registered in the permitted operation 24004 contained in the access control table 2400 coincides with the operation contained in the storage area control request, the data input/output program 8000 controls the storage area. When it is judged that the information registered in the permitted operation 24004 contained in the access control table 2400 does not coincide with the operation contained in the storage area control request, the data input/output program 8000 replies rejection of control to storage area.

When the administrator changes the configuration of the storage system, the table for managing the computer that permits the control to the storage area set in the storage system 400 is updated. Accordingly, the administrator can limit the computer that controls the storage area of the storage system without directly updating the table for managing the computer that permits the control to the storage area of the storage system 400. Thus, it becomes possible to reduce the load of the administrator in managing the storage and to suppress the increase of the cost for managing the storage.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
   a plurality of host computers;
   at least one storage system coupled to the host computers; and
   a management computer capable of accessing the host computers and the storage system; wherein:

each of the host computers has a first processor for carrying out arithmetic operations and a first memory connected to the first processor, and the first memory stores programs for providing a service, the first processor is configured to:

provide the services by executing the programs; and access, by using a data input/output request, a first type storage area as a command device provided by the storage system for changing a configuration of a second type storage area provided by the storage system and wherein further:

the at least one storage system has a second processor for carrying out arithmetic operations, a second memory connected to the second processor, the first type storage area as the command device and the second type storage area for storing data requested to be inputted from the host computers, the second memory stores first management information for managing a host computer group of two or more of the host computers that provides a common type of service and is permitted to change the configuration of the second type storage area in the storage system by accessing the first type storage area as the command device, the second processor is configured to permit or deny the host computers to change the configuration of the second type storage area in the storage system based on the first management information after receiving the data input/output request, the management computer has a third processor for carrying out arithmetic operations and a third memory connected to the third processor, the third memory stores second management information for managing a relationship between each of the host computers, the second type storage area and the first type storage area as the command device, and third management information for managing a type of service provided by each of the host computers that is permitted to change the configuration of the second type storage area in the storage system; and the third processor is configured to:

judge whether at least one of the host computers is permitted to change the configuration of the second type storage area based on whether there is correspondence between the second and the third management information; and set, when it is judged that the at least one of the host computers is permitted to change the configuration of the second type storage area, the host computer group in the first management information by using the at least one of the host computers.

2. The computer system according to claim 1, wherein:

the second memory stores the second management information, the computer system further comprises a service management computer for managing services provided by the host computers, the service management computer has a fourth processor for carrying out arithmetic operations and a fourth memory connected to the fourth processor for storing the third management information, and the third processor is configured to:

obtain the third management information stored in the fourth memory;

obtain the second management information stored in the second memory; and store the obtained second and third management information in the third memory.

3. The computer system according to claim 1, wherein the third processor is configured to:

judge, when a function for permitting the two or more of the host computers in the host computer group to change the configuration of the second type storage area is introduced into the computer system, whether the at least one of the host computers is permitted to change the configuration of the second type storage area based on correspondence between the second and the third management information; and create the first information based on the judgment.

4. The computer system according to claim 1, wherein the third processor is configured to:

judge, when a configuration of the storage system is changed, whether the at least one of the host computers is permitted to change the configuration of the second type storage area based on correspondence between the second and the third management information; and update the first management information based on the judgment.

5. The computer system according to claim 1, wherein:

the host computers include at least a first host computer and a second host computer, the second processor changes the configuration of the second type storage area when a control command is stored to the first type storage area as the command device, the second management information includes information indicating whether the second host computer can access the first type storage area as the command device, and the third processor is configured to:

specify the second host computer which provides a common type of service as the first host computer based on the third management information;

judge whether the second host computer can access the first type storage area as the command device based on the second management information;

permit the second host computer to change the configuration of the second type storage area to which the first host computer can access; and set the second host computer to the host computer group in the first management information.

6. The computer system according to claim 1, wherein:

the third management information includes information indicating roles of each of the host computers in the services provided by each of the host computers; and the third processor decides a permission of change of the configuration of the second type storage area based on the role of each of the host computers.

7. A computer system according to claim 1, wherein a list of the host computers that provide the common type of service and are permitted to change the configuration of the second type storage area is maintained in a computer management table that is updated automatically as a service provided by any of the host computers is updated.

8. A storage management computer, comprising:

a processor for carrying out arithmetic operations;

a memory connected to the processor; and an interface coupled to at least one storage system and a plurality of host computers, the host computers access a first type storage area provided in the storage system for changing a configuration of a second type storage area provided in the storage system, the storage system permits or denies the host computers to change the configuration of the second type storage area in the storage system based on first management information for managing a host computer group of two or more of the host computers, which provides a common type of service and is permitted to change the configuration of the second type storage area in the storage system by accessing the first type storage area, wherein:

the memory stores second management information for managing a relationship between each of the host computers, the second type storage area and the first type storage area, and third management information for managing a type of service provided by each of the host computers; and the processor is configured to:
- judge whether at least one of the host computers is permitted to change the configuration of the second type storage area provided by the storage system based on any correspondence between the second and the third management information; and
- set, when it is judged that the at least one of the host computers is permitted to change the configuration of the second type storage area, the host computer group in the first management information by using the at least one of the host computers.

9. The storage management computer according to claim 8, wherein:

the interface further couples to a service management computer for managing services provided by the host computers, the service management computer stores the third management information, and the processor is configured to:
- obtain the third management information stored in the service management computer via the interface;
- obtain the second management information stored in the storage system via the interface; and
- store the obtained second and third management information in the memory.

10. The storage management computer according to claim 8, wherein:

the processor judges whether the two or more of the host computers are permitted to change the configuration of the second type storage area based on correspondence between the second management information and the third management information when a function of allowing the two or more of the host computers to change the configuration of the second type storage area is introduced into the storage system; and the processor creates the first management information based on the judgment.

11. The storage management computer according to claim 8, wherein:

the processor judges whether the at least one of the host computers is permitted to change the configuration of the second type storage area based on correspondence between the second management information and the third management information when a configuration of the storage system is changed; and the processor updates the first management information based on the judgment.

12. The storage management computer according to claim 8, wherein:

the host computers include at least a first host computer and a second host computer, the storage system changes the configuration of the second type storage area in case of which a control command is stored to the first type storage area, the second management information includes information indicating whether the second host computer can access the first type storage area, and the processor is configured to:
- specify the second host computer which provides a common type of service as the first computer based on the third management information;
- judge whether the second host computer can access the first type storage area based on the second management information;
- permit the second host computer to change the configuration of the second type storage area to which the first host computer can access; and
- set the second host computer to the host computer group in the first management information.

13. The storage management computer according to claim 8, wherein:

the third management information includes information indicating roles of each of the host computers in the services provided by each of the host computers; and the processor decides a permission to change the configuration of the second type storage area based on the role of each of the host computers.

14. A first management information setting method for setting first managing information in a computer system including a plurality of host computers, at least one storage system coupled to the host computers and having both a first type storage area as a command device and a second type storage area for storing data inputted from the host computers, and a management computer which can access the host computers and the storage system, each of the host computers having a first processor for carrying out arithmetic operations and a first memory connected to the first processor, the storage system having a second processor for carrying out arithmetic operations, a second memory connected to the second processor, the first type storage area as the command device, and the second type storage area for storing data requested to be inputted from the host computers, the management computer having a third processor for carrying out arithmetic operations and a third memory connected to the third processor, the first management information setting method comprising:

storing, by the management computer, second management information for managing a relationship between each of the host computers, the second type storage area and the first type storage area, and third management information for managing a type of service provided by each of the host computers;

judging, by the management computer, whether at least one of the host computers is permitted to change a configuration of the second type storage area based on correspondence between the second and the third management information;

setting, by the management computer, when it is judged that the at least one of the host computers is permitted to change the configuration of the second type storage area, the first management information for managing a host computer group of two or more of the host computers, which provides a common type of service, includes the at least one of the host computers and is permitted to change the configuration of the second type storage area in the storage system by accessing the first type storage area, storing, by the storage system, the first management information;

accessing, by the host computers, the first type storage area in the storage system to change the configuration of the second type storage area in the storage system; and permitting or denying the host computers to change the configuration of the second type storage area in the storage system based on the first management information.

15. The first management information setting method according to claim 14, wherein:

the computer system further includes a service management computer having a fourth processor for carrying out arithmetic operations and a fourth memory connected to the fourth processor, for managing services provided by the host computer; and the method further comprises:

storing, by the storage system, the second management information;

storing, by the service management computer, the third management information;

obtaining, by the management computer, the third management information stored in the service management computer;

obtaining, by the management computer, the second management information stored in the storage system; and storing, by the management computer, the obtained second and third management information.

16. The first management information setting method according to claim 14, further comprising:

judging, by the management computer, when a function for permitting the two or more of the host computers in the host computer group to change the configuration of the second type storage area is introduced to the storage system, whether the at least one of the host computers is permitted to change the configuration of the second type storage area based on correspondence between the second management information and the third management information; and creating, by the management computer, the first management information based on the judgment.

17. The first management information setting method according to claim 14, further comprising:

judging, by the management computer, in case of which a configuration of the storage system is changed, whether the at least one of the host computers is permitted to change the configuration of the second type storage area based on correspondence between the second and third management information; and updating, by the management computer, the first management information based on the judgment.

18. The first management information setting method according to claim 14, wherein:

the host computers include at least a first host computer and a second host computer, the second management information includes information indicating whether the second host computer can access the first type storage area, the first management information setting method further comprises:

specifying, by the management computer, the second host computer which provides a common type of service as the first computer based on the third management information;

judging, by the management computer, whether the second host computer can access the first type storage area based on the second management information;

permitting, by the management computer, the second host computer to change the configuration of the second type storage area to which the first host computer can access;

setting, by the processor, the second host computer to the host computer group in the first management information; and changing, by the storage system, the configuration of the second type storage area based on a control command sent from the second host computer to the first type storage area.

19. The first management information setting method according to claim 14, wherein:

the third management information includes information indicating roles of each of the host computers in the services provided by each of the host computers; and the first management information setting method further comprises deciding, by the management computer, a permission of change of the configuration of the second type storage area based on the role of each of the host computers.

* * * * *